United States Patent
Johnson et al.

(10) Patent No.: US 10,690,033 B1
(45) Date of Patent: Jun. 23, 2020

(54) AFTERTREATMENT SYSTEMS AND METHODS FOR TREATMENT OF EXHAUST GAS FROM DIESEL ENGINE

(71) Applicants: John H. Johnson, Houghton, MI (US); Gordon G. Parker, Houghton, MI (US); Venkata Rajesh Chundru, San Antonio, TX (US)

(72) Inventors: John H. Johnson, Houghton, MI (US); Gordon G. Parker, Houghton, MI (US); Venkata Rajesh Chundru, San Antonio, TX (US)

( * ) Notice: Subject to any disclaimer, the term of this patent is extended or adjusted under 35 U.S.C. 154(b) by 0 days.

(21) Appl. No.: 16/675,093

(22) Filed: Nov. 5, 2019

(51) Int. Cl.
    *F01N 3/20* (2006.01)
    *F01N 3/035* (2006.01)
    *F02D 41/02* (2006.01)
    *F01N 9/00* (2006.01)
    (Continued)

(52) U.S. Cl.
CPC ............. *F01N 3/208* (2013.01); *F01N 3/035* (2013.01); *F01N 3/0871* (2013.01); *F01N 9/002* (2013.01); *F02D 41/029* (2013.01); *F01N 3/2066* (2013.01); *F01N 3/2828* (2013.01);
(Continued)

(58) Field of Classification Search
CPC ............. F01N 2610/02; F01N 2610/08; F01N 3/2066; F01N 13/009; F01N 3/106; F01N 2330/06; F01N 2330/30; F01N 2370/04; F01N 2510/063; F01N 3/0231; F01N 3/10; F01N 3/2828; F01N 3/2892; F01N 13/0093; F01N 2560/026; F01N 2900/08; F01N 2900/1402; F01N 3/208; F01N 2610/14; F01N 2900/12; F01N 2560/021;
(Continued)

(56) References Cited

U.S. PATENT DOCUMENTS

| 8,230,677 | B2 | 7/2012 | Devarakonda et al. |
| 8,899,023 | B2 | 12/2014 | Patchett et al. |
| 9,039,982 | B2 | 5/2015 | Patchett et al. |

(Continued)

OTHER PUBLICATIONS

Xiaobo Song, "A SCR Model based on Reactor and Engine Experimental Studies for a Cu-zeolite Catalyst", PhD Dissertation, 2013, Michigan Technological University.
(Continued)

*Primary Examiner* — Anthony Ayala Delgado
(74) *Attorney, Agent, or Firm* — Kolitch Romano LLP

(57) ABSTRACT

An aftertreatment system to treat exhaust gas from a diesel engine is provided. The aftertreatment system comprises a selective catalytic reduction catalyst on a diesel particulate filter (SCR-F); a first reductant injector connected to an exhaust gas passage upstream of the SCR-F; a downstream diesel oxidation catalyst (DOC) disposed downstream of the SCR-F; a selective catalyst reduction catalyst (SCR) disposed downstream of the downstream DOC; a second reductant injector coupled to an exhaust gas passage positioned between the downstream DOC and the SCR; and a controller to determine a desired particulate matter (PM) oxidation in the SCR-F and a desired system NOx conversion based on engine conditions, and to control a first reductant flowrate from the first reductant injector and a second reductant flowrate from the second reductant injector based on the desired PM oxidation in the SCR-F and the desired system NOx conversion.

18 Claims, 16 Drawing Sheets

(51) Int. Cl.
*F01N 3/08* (2006.01)
*F01N 3/28* (2006.01)

(52) U.S. Cl.
CPC ........ *F01N 3/2892* (2013.01); *F01N 2610/08* (2013.01); *F01N 2900/1611* (2013.01)

(58) Field of Classification Search
CPC .......... F01N 2610/146; F01N 2900/14; F01N 2900/1622; F01N 3/035; Y02T 10/24
See application file for complete search history.

(56) References Cited

U.S. PATENT DOCUMENTS

| | | | |
|---|---|---|---|
| 9,039,983 | B1 | 5/2015 | Patchett et al. |
| 9,039,984 | B1 | 5/2015 | Patchett et al. |
| 9,040,006 | B1 | 5/2015 | Patchett et al. |
| 9,121,327 | B2 | 9/2015 | Patchett et al. |
| 9,144,795 | B2 | 9/2015 | Patchett et al. |
| 9,517,455 | B2 | 12/2016 | Patchett et al. |
| 9,517,456 | B2 | 12/2016 | Patchett et al. |
| 9,757,717 | B2 | 9/2017 | Patchett et al. |
| 2015/0052878 | A1 | 2/2015 | Qi |
| 2017/0122159 | A1* | 5/2017 | Bahrami ................ F01N 3/103 |
| 2018/0230877 | A1* | 8/2018 | Nilsson ................ F01N 3/0814 |
| 2019/0345861 | A1* | 11/2019 | Johansson ................ F01N 9/00 |
| 2019/0366827 | A1* | 12/2019 | Tsuchiyama ............ B60L 58/14 |
| 2019/0383192 | A1* | 12/2019 | Dou ........................ F01N 3/035 |

OTHER PUBLICATIONS

Song et al., "A review of the literature of selective catalytic reduction catalysts integrated into diesel particulate filters", article, International Journal of Engine Research, vol. 16, No. 6, published 2015, retrieved online at jer.sagepub.com at Michigan Technological University on Dec. 7, 2016.

Erik A. Gustafson, "An Experimental Investigation into NO2 Assisted Passive Oxidation with and Without Urea Dosing and Active Regeneration of Particulate Matter for a SCR Catalyst on a DPF", M.S. Thesis, 2016, Michigan Technological University.

Vaibhav Kadam, "An Experimental Investigation of the Effect of Temperature and Space Velocity on the Performance of a Cu-Zeolite Flow-Through SCR and a SCR Catalyst on a DPF With and Without PM Loading", M.S. Thesis, 2016, Michigan Technological University.

Sagar Sharma, "The Emission and Particulate Matter Oxidation Performance of a SCR Catalyst on a Diesel Particulate Filter with a Downstream SCR", M.S. Report, 2017, Michigan Technological University.

Sharp et al., "Achieving Ultra Low NOX Emissions Levels with a 2017 Heavy-Duty On-Highway TC Diesel Engine and an Advanced Technology Emissions System—Thermal Management Strategies", article, published Mar. 28, 2017, SAE International Journal of Engines, vol. 10, No. 2017-01-0954.

Sharp et al.. "Achieving Ultra Low NOX Emissions Levels with a 2017 Heavy-Duty On-Highway TC Diesel Engine—Comparison of Advanced Technology Approaches", article, published Mar. 28, 2017, SAE International Journal of Engines, vol. 10, No. 2017-01-0956.

Sharp et al., "Achieving Ultra Low NOX Emissions Levels with a 2017 Heavy-Duty On-Highway TC Diesel Engine and an Advanced Technology Emissions System—NOx Management Strategies", article, published Mar. 28, 2017, SAE International Journal of Engines, vol. 10, No. 2017-01-0958.

Chundru et al., "Development of a 2D Model of a SCR Catalyst on a DPF", article, published Apr. 3, 2019, Journal of Emission Control Science Technology.

Chundru et al., "The Effect of NO2/NOx Ratio on the Performance of a SCR Downstream of a SCR Catalyst on a DPF," article, published Jun. 14, 2019, SAE International Journal of Engines.

Venkata Chundru, "Development of a 2D SCR Catalyst on a Diesel Particulate Filter Model for Design and Control Applications to a Ultra Low NOx Aftertreatment System", PhD Dissertation, 2019, Michigan Technological University.

Harsha S. Surenahalli, "Dynamic Model Based State Estimation in a Heavy-Duty Diesel Aftertreatment System for Onboard Diagnostics and Controls", Dissertation, 2013, Michigan Technological University.

Park et al., "Development and validation of a model for wall-flow type selective catalytic reduction system", article, published May 4, 2011, Proceedings of the Institution of Mechanical Engineers, Part D: Journal of Automobile Engineering.

* cited by examiner

| Table 1. Specifications of DOC, SCR-F, Downstream DOC and SCR for Parametric Studies | | | |
|---|---|---|---|
| | DOC and Downstream DOC | SCR | SCR-F |
| Material | Cordierite | Cordierite | Cordierite |
| Catalyst | Pt | Cu-zeolite | Cu-zeolite |
| Diameter (in) | 9.5 | 10.5 | 10.5 |
| Diameter of Substrate (mm) | 241.3 | 266.7 | 266.7 |
| Length (in) | 4 | 12 | 12 |
| Length (mm) | 101.6 | 304.8 | 304.8 |
| Cell Geometry | Square | Square | Square |
| Total Volume (L) | 4.65 | 17.04 | 17.04 |
| Open Volume (L) | 3.5 | 14.04 | 10.2 |
| Cell Density/$in^2$ | 400 | 400 | 200 |
| Cell Width (mil) | 46 | 46 | 55 |
| Cell Width (mm) | 1.16 | 1.16 | 1.39 |
| Filtration Area ($in^2$) | N/A | N/A | 11370 |
| Open Frontal Area ($in^2$) | 60 | 73.29 | 25.9 |
| Channel Wall Thickness (mil) | 4 | 4 | 16 |
| Wall Density (g/$cm^3$) | 1.2 | 0.91 | - |
| Porosity (%) | 35 | 35 | 50 |
| Mean Pore Size (μm) | N/A | N/A | 16 |
| Number of Inlet Cells | 28353 | 34636 | 8659 |
| Actual Open Surface Area ($m^2$) | 4.22 | 17.26 | 7.37 |
| Surface Area of Cells ($m^2$) | 12.08 | 49.33 | 14.74 |
| Perimeter of Cell(mm) | 4.67 | 4.67 | 5.58 |

FIG. 7

| Table 2. SCR-F + SCR system with 1 injector inlet condition ||||||
|---|---|---|---|---|---|
| | Exhaust Gas Flowrate (kg/min) | SCR-F Inlet Temp.(°C) | SCR-F Inlet $NO_2$(ppm) | SCR-F Inlet $NO_x$(ppm) | SCR-F Inlet $NO_2/NO_x$ | Inlet ANR1 |
| A | 5.6 | 267 | 215 | 590 | 0.44 | 1.10 |
| C | 6.9 | 339 | 290 | 689 | 0.44 | 1.02 |
| E | 7.1 | 342 | 584 | 1450 | 0.37 | 1.03 |
| B | 3.7 | 256 | 758 | 1580 | 0.48 | 1.10 |
| D | 12.5 | 366 | 161 | 450 | 0.38 | 1.06 |
| 1 | 5.2 | 203 | 182 | 625 | 0.29 | 1.06 |

FIG. 8

| Table 3. Maximum System NOX Conversion Efficiency of An Aftertreatment System Comprising SCR-F, Downstream DOC And SCR With Two Reductant Injectors At Different Engine Conditions ||||||
| --- | --- | --- | --- | --- | --- |
| | Engine condition 1 | Engine condition A | Engine condition C | Engine condition D | Engine condition E |
| ANR1 | 0.72 | 0.8 | 0.65 | 0.8 | 0.8 |
| ANR2 | 1.04 | 1.03 | 1.06 | 1.04 | 1.03 |
| Reductant flow rate in first injector (ml/s) | 0.109 | 0.391 | 0.172 | 0.209 | 0.408 |
| Reductant flow rate in second injector (ml/s) | 0.047 | 0.102 | 0.085 | 0.058 | 0.106 |
| Total urea flow rate (ml/s) | 0.156 | 0.493 | 0.258 | 0.268 | 0.513 |
| System NOxconversion efficiency | 99.3 | 99.8 | 99.9 | 99.2 | 99.8 |
| SCR-F PM oxidation rate (g/min) | 0.01 | 0.013 | 0.07 | 0.036 | 0.04 |
| SCR NH3 Slip (ppm) | 39 | 24 | 14 | 28 | 19 |

FIG. 12

| Table 4. Maximum PM Oxidation Rate (ANR = 0) with PM Loading 2 g/l of an Aftertreatment System Comprising SCR-F, Downstream DOC and SCR With Two Reductant Injectors At Different Engine Conditions | | | | | |
|---|---|---|---|---|---|
|  | Engine condition 1 | Engine condition A | Engine condition C | Engine condition D | Engine condition E |
| ANR2 | 1.12 | 1.12 | 1.12 | 1.12 | 1.12 |
| A Reductant flow rate in injector 2 (ml/s) | 0.169 | 0.548 | 0.297 | 0.293 | 0.571 |
| System NOx conversion Efficiency (%) | 93.5 | 91.5 | 94 | 91 | 94.9 |
| SCR-F PM oxidation rate (g/min) | 0.041 | 0.057 | 0.21 | 0.13 | 0.5 |
| SCR NH3 Slip (ppm) | 80 | 70 | 83 | 60 | 90 |

FIG. 13

| Table 5. SCR-F vs SCR-F+Downstream DOC+SCR System Performance for Maximum NOx Conversion Efficiency at different Engine conditions | | | | | |
|---|---|---|---|---|---|
| | Engine condition 1 | Engine condition A | Engine condition C | Engine condition D | Engine condition E |
| ANR (SCR-F system) | 1.06 | 1.05 | 1.07 | 1.06 | 1.08 |
| Total reductant flow rate (ml/s) | 0.16 | 0.514 | 0.284 | 0.277 | 0.55 |
| System NOx conv. effi. (%) | 91 | 97.6 | 97.4 | 95 | 98 |
| SCR-F PM oxid. Rate (g/min) | 0.001 | 0.005 | 0.04 | 0.012 | 0.028 |
| System NH3 slip (ppm) | 41 | 25 | 80 | 97 | 174 |
| ANR1/ ANR2 (SCR-F+downstream DOC+SCR system) | 0.72/1.04 | 0.80/1.03 | 0.65/1.07 | 0.80/1.04 | 0.80/1.03 |
| Total reductant flow rate (ml/s) | 0.156 | 0.493 | 0.258 | 0.268 | 0.513 |
| System NOx conv. effi. (%) | 99.3 | 99.8 | 99.9 | 99.2 | 99.8 |
| SCR-F PM oxid. Rate (g/min) | 0.01 | 0.013 | 0.07 | 0.036 | 0.04 |
| System NH3 slip (ppm) | 39 | 24 | 17 | 28 | 19 |

FIG. 14

| Table 6. Comparison of Performance of Four Aftertreatment Systems (ANR=1.04) ||||||
|---|---|---|---|---|
| System | NOx conversion Efficiency (%) | PM oxidation rate (g/min) | NH$_3$ Slip (ppm) | Reductant flow rate (m/s) |
| System 4 (SCR-F, 1 injector) (ANR1= 1.04, ANR2 = 0) | 97.8 | 0.039 | 75 | 0.276 |
| System 3 (SCR-F+SCR, 1 injector) (ANR1= 1.04, ANR2 = 0) | 98 | 0.039 | 50 | 0.276 |
| System 2 (SCR-F+SCR, 2 injectors) (ANR1= 0.65, ANR2 = 1.06) | 98.5 | 0.07 | 22 | 0.275 |
| System 1 (SCR-F +downstream DOC+SCR, 2 injectors) (ANR1= 0.65, ANR2 = 1.06) | 99.9 | 0.07 | 14 | 0.274 |

FIG. 16

AFTERTREATMENT SYSTEMS AND METHODS FOR TREATMENT OF EXHAUST GAS FROM DIESEL ENGINE

FIELD

This disclosure relates to systems and methods for treatment of exhaust gas from a diesel engine. More specifically, the disclosed embodiments relate to systems and methods to control reductant injection into an aftertreatment system of a diesel engine to reduce particulate matter and $NO_x$ in the exhaust gas from the diesel engine.

INTRODUCTION

Selective catalytic reduction (SCR) technology has been used to reduce NOx emissions from heavy-duty engines. The ultra-low NOx emission standard of 0.02 g/bhp-hr for the heavy-duty diesel engine has been proposed by the California Air Resources Board (CARB). To meet the stringent regulatory $NO_x$ emission standards for heavy-duty diesel truck engines, an ultra-low aftertreatment system needs to be developed. For example, an aftertreatment system has been studied that includes an upstream diesel oxidation catalyst (DOC), a selective catalytic reduction catalyst on a diesel particulate filter (SCR-F) and a selective catalyst reduction catalyst (SCR). The major factors that limit the performance of such aftertreatment system in terms of $NO_x$ reduction are catalyst aging in the SCR-F, ash loading in the SCR-F, transport of the platinum group metals (PGM) from the upstream diesel oxidation catalyst (DOC) to the SCR-F and unfavorable $NO_2/NO_x$ ratio to the inlet at the downstream SCR, which can lead to reduction of the NOx conversion of the downstream SCR and the system. Thus, there is need to improve the aftertreatment system such that the $NO_x$ emission standards can be met at various engine operating conditions such as at cold start and hot conditions and the particulate matter (PM) oxidation rate in the SCR-F also needs to be increased at various engine operating conditions.

SUMMARY

The present disclosure provides systems, apparatuses, and methods relating to aftertreatment systems of an engine.

According to one aspect of the present disclosure, an aftertreatment system to treat exhaust gas from a diesel engine is provided. The aftertreatment system comprises a selective catalytic reduction catalyst on a diesel particulate filter (SCR-F); a first reductant injector connected to an exhaust gas passage upstream of the SCR-F; a downstream diesel oxidation catalyst (DOC) disposed downstream of the SCR-F; a selective catalyst reduction catalyst (SCR) disposed downstream of the downstream DOC; a second reductant injector coupled to an exhaust gas passage positioned between the downstream DOC and the SCR; and a controller to determine a desired particulate matter (PM) oxidation in the SCR-F and a desired system NOx conversion efficiency based on engine conditions, and to control a first reductant flowrate from the first reductant injector and to control a second reductant flowrate from the second reductant injector based on the desired PM oxidation in the SCR-F and the desired system NOx conversion.

According to another aspect of the present disclosure, an aftertreatment system to treat exhaust gas from a diesel engine. The aftertreatment system comprises a selective catalytic reduction catalyst on a diesel particulate filter (SCR-F); a first reductant injector connected to an exhaust gas passage upstream of the SCR-F; a downstream diesel oxidation catalyst (DOC) disposed downstream of the SCR-F; a selective catalyst reduction catalyst (SCR) disposed downstream of the downstream DOC; a second reductant injector coupled to an exhaust gas passage and positioned between the downstream DOC and the SCR; and a controller to calculate a desired particulate matter (PM) oxidation in the SCR-F and a desired system NOx conversion efficiency based on engine speed and load conditions, to determine a first ammonia to NOx ratio to the SCR-F and a second ammonia to NOx ratio to the SCR based on (i) the desired PM oxidation, (ii) the desired NOx conversion efficiency, and (iii) states of the SCR-F, the downstream DOC and the SCR, and to determine a first reductant flowrate from the first reductant injector and a second reductant flowrate from the second reductant injector corresponding to the first ammonia to NOx ratio and the second ammonia to NOx ratio, respectively. A reductant is a urea solution, and wherein the states of the SCR-F, the downstream DOC and the SCR include temperatures, PM concentrations, ammonia coverage fraction of two storage sites in the SCR-F and SCR and NOx concentrations of the exhaust gas as the exhaust gas flows through the SCR-F, the downstream DOC and the SCR, respectively.

According to yet another aspect of the present disclosure, a method is provided to operate an aftertreatment system for a diesel engine. The aftertreatment system includes a SCR-F, a SCR downstream of the SCR-F and a downstream DOC disposed between the SCR-F and the SCR. The method comprises determining a desired PM oxidation rate in the SCR-F and a system NOx conversion efficiency based on engine speed and load conditions; and determining a first reductant flowrate from a first reductant injector positioned upstream of the SCR-F and a second reductant flowrate from a second reductant injector positioned upstream of the SCR based on the desired PM oxidation rate, the desired system NOx conversion efficiency, and changes of PM concentration, NOx concentration and temperature as exhaust gas flows through the SCR-F, the downstream DOC and the SCR.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 7 shows Table 1 which lists the specifications of exemplary treatments devices of the aftertreatment system of the present disclosure.

FIG. 8 shows Table 2 which lists the conditions for test points A, C, E, B, D and 1 for model simulation/experiments.

FIG. 12 shows Table 3 which lists maximum $NO_x$ conversion efficiency of an aftertreatment system comprising a SCR-F, a downstream DOC and SCR with two reductant injectors at certain engine conditions.

FIG. 13 shows Table 4 which lists maximum PM oxidation rate of an aftertreatment system comprising a SCR-F, a downstream DOC and SCR with two reductant injectors at certain engine conditions.

FIG. 14 shows Table 5 comparing the performance of an aftertreatment system including only SCR-F with an aftertreatment system including SCR-F, downstream DOC, and SCR system for maximum NOx conversion efficiency.

FIG. 16 shows a Table 6 which compares the performance of four aftertreatment systems of an engine.

DETAILED DESCRIPTION

Figure 1:
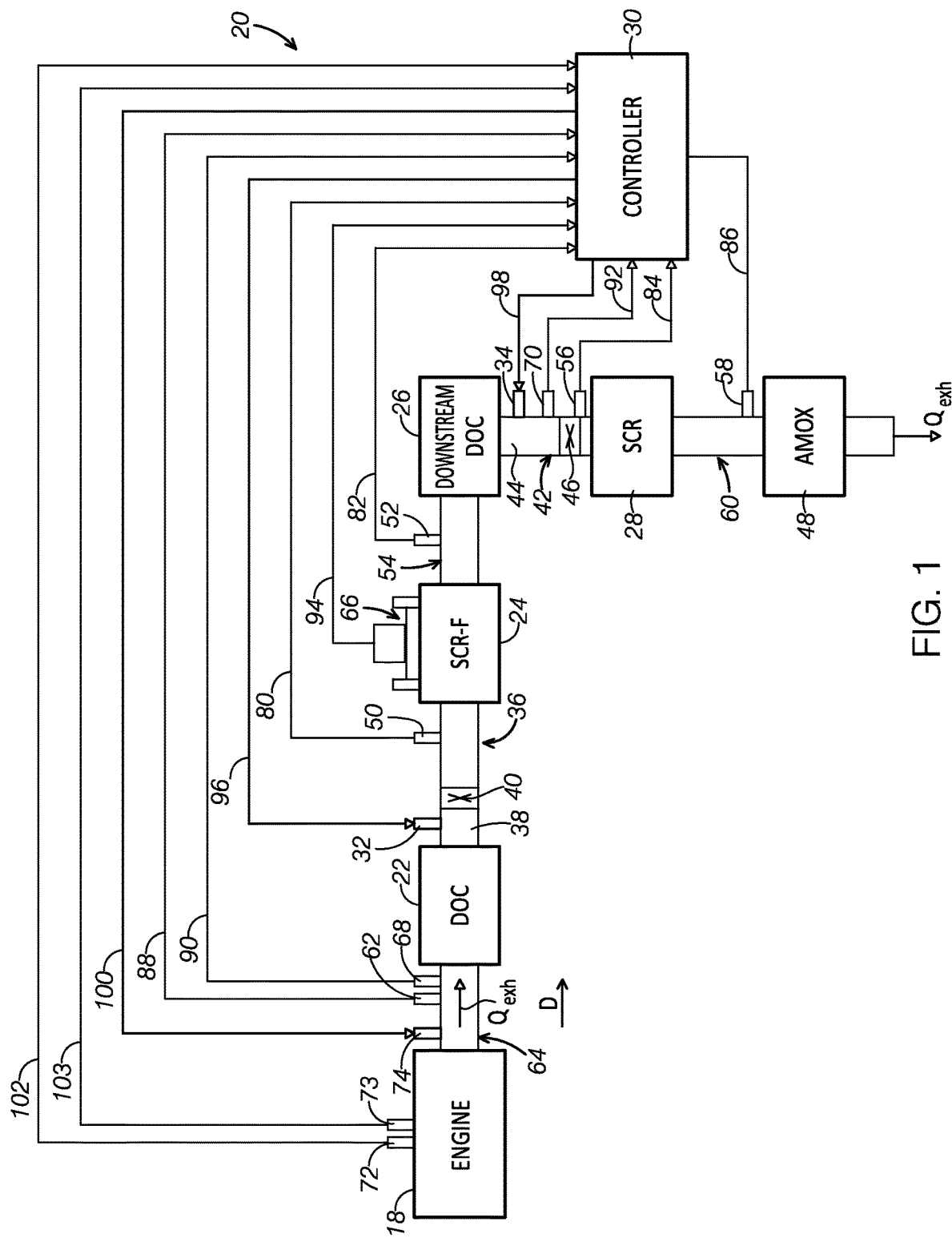
FIG. 1 is a schematic diagram illustrating an aftertreatment system for a diesel engine in accordance with one aspect of the present disclosure.

Various aspects and examples of aftertreatment systems comprising a SCR-F, a downstream DOC, a SCR and two reductant injectors, as well as related methods to operate the aftertreatment systems, are described below and illustrated in the associated drawings. Unless otherwise specified, an aftertreatment system and an engine in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through E, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or Overview In general, the aftertreatment systems of a diesel engine in accordance with the present teachings may include a DOC, a SCR-F following the DOC, a downstream DOC following the SCR-F, a SCR following the downstream DOC, a first reductant injector positioned upstream of the SCR-F, a second reductant injector positioned upstream of the SCR and controller to control the reductant injections into the SCR-F and the SCR. The present disclosure further provides control methods to operate the aftertreatment systems. The aftertreatment systems and methods to operate the aftertreatment system in accordance with the present teachings may include determining a first reductant flowrate into the SCR-F and a second reductant flowrate into the SCR based on desired particulate matter (PM) oxidation rate and NOx conversion efficiency.

Examples, Components, and Alternatives

The following sections describe selected aspects of exemplary aftertreatment systems of a diesel engine with two reductant injectors as well as related methods. The examples in these sections are intended for illustration and should not be interpreted as limiting the scope of the present disclosure. Each section may include one or more distinct embodiments or examples, and/or contextual or related information, function, and/or structure.

A. Illustrative Aftertreatment Systems for a Diesel Engine

FIG. 1 is a schematic diagram illustrating an aftertreatment system 20 for a diesel engine 18 in accordance with one aspect of the present disclosure. In some embodiments, diesel engine 18 may be a heavy-duty engine in a truck or a passenger vehicle. In other embodiments, engine 18 may be used in off-road equipment such as construction equipment and agricultural equipment. The exhaust gas emitted from engine 18 includes various pollutants such as hydrocarbon (HC), carbon monoxide (CO), particulate matters (PM) and nitric oxides ($NO_x$) which are regulated by the Environmental Protection Agency (EPA). Aftertreatment system 20 is configured to achieve high NOx conversion efficiency while meeting the desired PM oxidation requirements.

In some embodiments, aftertreatment system 20 may comprise an upstream diesel oxidation catalyst (DOC) 22, a SCR catalyst on a diesel particulate filter (SCR-F) 24 disposed downstream of DOC 22 along a direction D of an exhaust gas flow $\dot{m}_{exhaust}$, a downstream DOC 26 disposed downstream of SCR-F 24, a SCR catalyst (SCR) 28 disposed downstream of downstream DOC 26 and a controller 30. Aftertreatment system 20 may further comprise a first reductant injector 32 disposed upstream of SCR-F 24 and a second reductant injector 34 disposed upstream of SCR 28. First reductant injector 32 may be disposed at an exhaust passage 36 upstream of SCR-F 24. In the depicted embodiment, exhaust passage 36 is located between DOC 22 and SCR-F 24. In some embodiments, the reductant used in aftertreatment system 20 is urea solution such as diesel exhaust fluid (DEF). The exhaust passage 36 may include a first urea decomposition tube 38 configured to decompose urea from first reductant injector 32 into ammonia and a first mixer 40 following decomposition tube 38 to mix ammonia with the exhaust gas. Similarly, an exhaust gas passage 42 upstream of SCR 28 may include a second urea decomposition tube 44 configured to decompose urea from second reductant injector 34 into ammonia and a second mixer 46 to mix ammonia with the exhaust gas.

In some embodiments, aftertreatment system 20 may further comprise ammonia oxidation catalyst (AMOX) 48 for oxidation of $NH_3$ discharged from SCR 28 (AKA $NH_3$ slip) into nitrogen and water vapor. AMOX 48 is selective toward the formation of nitrogen rather than $NO_x$ or $N_2O$. AMOX 48 may include catalyst such as platinum, copper, refractory metal oxide and Zeolite.

It should be understood that the DOC, SCR-F, SCR, and AMOX refer to aftertreatment devices or components of the aftertreatment system in the present disclosure, which will be described in detail below.

Aftertreatment system 20 may further comprise various sensors to detect operation-related parameters and send detected information to controller 30 for controlling the operations of aftertreatment system 20. For example, a first temperature sensor 50 is positioned on exhaust gas passage 36 to detect an inlet temperature of SCR-F 24. In the depicted embodiment, first temperature sensor 50 is positioned downstream of first mixer 40. A second temperature sensor 52 is positioned in an exhaust gas passage 54 which is an exhaust gas passage between SCR-F 24 and downstream DOC 26 to detect an outlet temperature of SCR-F 24 and an inlet temperature of downstream DOC 26. A third temperature sensor 56 is positioned on exhaust passage 42 to detect an outlet temperature of downstream DOC and an inlet temperature of SCR 28. In the depicted embodiment, third temperature sensor 56 is positioned downstream of second mixer 46. A fourth temperature sensor 58 is positioned in an exhaust gas passage 60 to detect an outlet temperature of SCR 28 and an inlet temperature of AMOX 48. In the depicted embodiment, aftertreatment system 20 includes DOC 22 upstream of SCR-F. A fifth temperature sensor 62 is positioned in an exhaust gas passage 64 between engine 18 and DOC 22 to detect a temperature of exhaust gas from engine 18 and an inlet temperature of DOC 22.

To determine performance and/or state of SCR-F 24, information on the PM retained in the SCR-F is utilized. In some embodiments, a pressure sensor 66 is positioned on SCR-F 24 to measure a pressure drop across SCR-F 24 for estimation of PM retained in the filter. Additionally or alternatively, an inlet pressure sensor may be positioned on exhaust gas passage to detect the exhaust gas pressure at an inlet of SCR-F 24. Any appropriate PM sensor and pressure sensor may be used.

In some embodiments, a first $NO_x$ sensor 68 is positioned on exhaust gas passage 64 to detect a $NO_x$ concentration in the exhaust gas discharged from engine 18. The NOx concentration detected by $NO_x$ sensor 68 represents a $NO_x$ inlet concentration of SCR-F. Additionally or alternatively, a second $NO_x$ sensor 70 is positioned on exhaust passage 42 to detect a $NO_x$ inlet concentration of SCR 28. The $NO_x$ sensor may detect $NO_2$ and NO concentrations and any appropriate $NO_x$ sensor may be used.

In some embodiments, the exhaust flowrate may be determined by air and fuel flowrates detected from an air flowrate sensor 72 and a fuel flowrate sensor 73.

It should be appreciated that aftertreatment system 20 may include more or less temperature sensors, $NO_x$ sensor, PM sensor or pressure sensor than those illustrated in FIG. 1 depending on control algorithm to control the operations of the aftertreatment system and output information from an engine control unit.

In some embodiments, a fuel doser 74 may be connected to exhaust gas passage 64 to meter fuel into DOC 22 for the purpose of active regeneration of the PM in the SCR-F.

When the exhaust gas from engine 18 flows through the aftertreatment devices (e.g., DOC 22, SCR-F 24, downstream DOC 26, SCR 28 and AMOX 48) sequentially, species in the exhaust gas experience a number of chemical reactions, which causes reduced pollutant concentrations in the exhaust gas discharged to ambient air. The aftertreatment devices will be described below. DOC 22 is a flow through device used to oxidize CO, HC and NO. In some embodiments, DOC 22 may be further configured to receive fuel from fuel doser 74 to oxidize the dosed fuel to enable periodic regeneration of downstream SCR-F 24 to remove the excess PM retained in SCR-F 24. DOC 22 comprise substrate and catalyst coated on the substrate. In one embodiment, DOC 22 comprises square channels coated with platinum/palladium catalyst washcoat and the substrate is Cordierite. It should be appreciated that other catalyst and substrate materials and configurations such as rhodium and barium may be used in DOC 22. One example specification of DOC 22 is described in Table 1 in FIG. 7. As the exhaust gas flows through the channels in DOC 22, the gaseous species diffuse on to the surface of the catalyst and are oxidized. The products of the reactions then diffuse back to the gas phase. The following reactions occur in DOC 22:

$$CO + \frac{1}{2}O_2 \rightarrow CO_2 \qquad (1)$$

$$NO + \frac{1}{2}O_2 \leftrightarrow NO_2 \qquad (2)$$

$$C_3H_6 + \frac{9}{2}O_2 \rightarrow 3CO_2 + 3H_2O \qquad (3)$$

SCR-F 24 is used to simultaneously remove and oxidize particulate matter and to reduce $NO_x$ emissions from the exhaust gas. In some embodiments, SCR-F 24 is a wall flow particulate filter and comprises SCR catalyst and porous filter substrate. The catalyst in SCR-F 24 may include but not limited to copper zeolite, iron zeolite, vanadium, Titania. The catalyst is configured to adsorb reductant and reduce $NO_x$ to nitrogen and water vaper via SCR reactions. The porous material in SCR-F 24 may include but not limited to cordierite, silicon carbide, ceramics and metallic meshes. One example specification of SCR-F 24 is described in Table 1 in FIG. 7. SCR-F 24 is configured to enable NOx emission reduction and PM filtration and oxidation from the exhaust gas. A number of reactions occur in SCR-F as explained below.

| | | |
|---|---|---|
| $NH_3$ adsorption/ desorption at site 1 and site 2: | $NH_3 \leftrightarrow NH_3^*$ | (4) |
| Fast *SCR*: | $NH_3^* + \frac{1}{2}NO + \frac{1}{2}NO_2 \rightarrow N_2 + \frac{3}{2}H_2O$ | (5) |
| Slow *SCR*: | $NH_3^* + \frac{3}{4}NO_2 \rightarrow \frac{7}{8}N_2 + \frac{3}{2}H_2O$ | (6) |
| Standard *SCR*: | $NH_3^* + NO + \frac{1}{4}O_2 \rightarrow N_2 + \frac{3}{2}H_2O$ | (7) |
| $NH_3$ oxidation: | $NH_3^* + \frac{3}{4}O_2 \rightarrow \frac{1}{2}N_2 + \frac{3}{2}H_2O$ | (8) |
| NO oxidation: | $NO + \frac{1}{2}O_2 \leftrightarrow NO_2$ | (9) |
| Passive *PM* oxidation: | $C + (2 - g_{co})NO_2 \rightarrow g_{co}CO + (1 - g_{co})CO_2 + (2 - g_{co})NO$ | (10) |
| Thermal *PM* oxidation: | $C + \left(1 - \frac{f_{co}}{2}\right)O_2 \rightarrow f_{co}CO + (1 - f_{co})CO_2$ | (11) |
| CO oxidation: | $CO + \frac{1}{2}O_2 \rightarrow CO_2$ | (12) |
| HC oxidation: | $C_{12}H_{24} + 18O_2 \rightarrow 12CO_2 + 12H_2O$ | (13) |

As described above, the reactions of fast SCR, slow SCR and standard SCR reduce NO and $NO_2$ by the reductant ammonia. Additionally, $NH_3$ oxidation oxidizes ammonia into nitrogen gas and NO oxidation oxidizes NO into $NO_2$. Additionally, passive PM oxidation and thermal PM oxidation oxidize PM or soot into CO and $CO_2$. Additionally, CO oxidation also occurs to oxidize CO into $CO_2$ and HC oxidation occurs to oxidize hydrocarbon into $CO_2$ and $H_2O$.

Downstream DOC 26 receives the exhaust gas from SCR-F 24. Downstream DOC 26 is a flow through device and may comprise substrate and catalyst similar or different to those in DOC 22. In the depicted embodiment, downstream DOC 26 is a separate device from SCR-F 24. In other words, downstream DOC 26 includes an individual housing to accommodate substrate and catalyst. Such configuration allows accurate detection of the inlet temperature of downstream DOC 26 by the temperature sensor, which enables better estimation of species concentrations into downstream DOC 26 or the state of downstream DOC 26 and the states of aftertreatment devices (e.g., SCR 28). One example specification of downstream DOC 26 is described in Table 1 in FIG. 7.

The oxidation reactions occurring in downstream DOC 26 are similar to equations (1) to (3) in DOC 22.

SCR 28 is a flow through device configured to reduce $NO_x$ in the exhaust gas from DOC 26. SCR 28 may use a catalyst similar or different to that in SCR-F 24. One example specification of SCR 28 is described in Table 1 in FIG. 7. $NO_x$ in the exhaust gas is reduced into nitrogen and water vapor. The reactions in SCR 28 are similar to reactions (4)-(13).

The two reductant injectors in aftertreatment system 20 enables flexible control of ammonia to NOx ratio (ANR) into SCR-F 24 and SCR 28, respectively. By changing the ANR values via two reductant injectors 32, 34, the contribution of the two aftertreatment devices (e.g., SCR-F 24 and SCR 28) in terms of $NO_x$ conversion can be changed dynamically based on engine operating conditions and the $NO_x$ conversion performance of SCR-F and SCR. Further, the inclusion of second reductant injector 34 allows a reduced ammonia $NO_x$ ratio ANR1 at the inlet of SCR-F 24 to increase the $NO_2$ assisted PM oxidation rate. The increase in $NO_2$ assisted PM oxidation is due to reduced forward diffusion of $NO_2$ from PM cake layer to the substrate wall which is a function of the fast SCR reaction in the wall and thus the ANR1 of the SCR-F 24 inlet. The resultant reduction in $NO_x$ conversion in SCR-F can be compensated by increased ammonia to $NO_x$ ratio ANR2 at the SCR inlet. Furthermore, the oxidation of NO in downstream DOC 26 converts NO to $NO_2$ and increases an inlet $NO_2/NOx$ to SCR 28 to a ratio favorable to $NO_x$ conversion.

Controller 30 is configured to control first reductant injector 32 and second reductant injector 34 to inject the reductant into the SCR-F 24 and the SCR 28, respectively, to achieve the desired system $NO_x$ conversion efficiency and the desired PM oxidation rate in the SCR-F. For example, controller 30 may determine a reductant flowrate from first reductant injector 32 and second reductant injector 34 based on the desired system $NO_x$ conversion efficiency and the desired PM oxidation rate according to engine operation conditions and the states of the aftertreatment devices in the aftertreatment system (e.g., DOC 22, SCR-F 24, downstream DOC 26 and SCR 28). The engine operation conditions may be determined by a map for engine speed and load conditions. The states of aftertreatment devices may be determined by a control algorithm executed by in controller 30. Controller 30 receives information from various sensors for use as inputs to the control algorithm. For examples, controller 30 is configured to receive temperature data from first temperature sensor 50 via a signal line 80, from second temperature sensor 52 via a signal line 82, from third temperature sensor 56 via a signal line 84, from fourth temperature sensor 58 via a signal line 86, and from fifth temperature sensor 62 via a signal line 88. Further, controller 30 is configured to receive $NO_x$ data/information from first $NO_x$ sensor 68 via a signal line 90 and from second $NO_x$ sensor 70 via a signal line 92. Further, controller 30 is configured to receive pressure data/information from pressure sensor 66 via a signal line 94. Further, controller 30 is configured to receive exhaust flowrate data/information detected by an air flowrate sensor 72 via a signal line 102. Air flowrate sensor 72 and fuel flowrate sensor 73 are positioned at an engine inlet. Controller 30 determines the exhaust gas flowrate based on the air flowrate and the fuel flowrate. In some embodiments, controller 30 receives the information on the airflow rate from air flowrate sensor 72 and information on the fuel flowrate from the fuel flowrate sensor 73 directly. In some embodiment, controller 30 receives the exhaust information from an engine control unit (ECU). Based on the determined first and reductant flowrates, control 30 sends control signals via signal lines 96 and 98 to first reductant injector 32 and second reductant injector 34, respectively for controlling the injection of the reductant. In some embodiments, control 30 is further configured to send a signal via a signal line 100 to fuel doser 74 to control the fuel injection into DOC 22.

Figure 2:
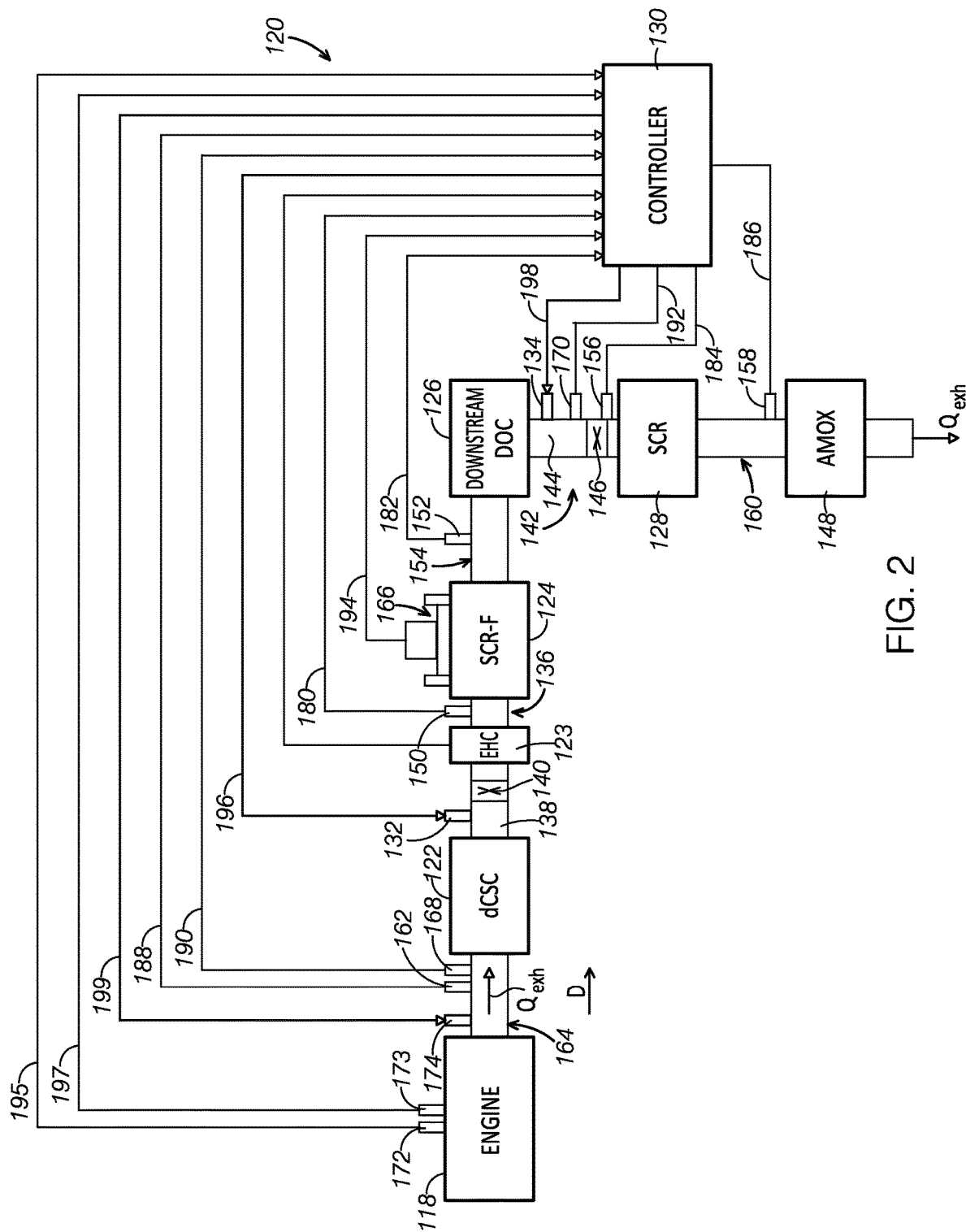
FIG. 2 is a schematic diagram illustrating an aftertreatment system for a diesel engine in accordance with another aspect of the present disclosure.

FIG. 2 is a schematic diagram illustrating an aftertreatment system 120 for a diesel engine 18 in accordance with another aspect of the present disclosure. For the sake of brevity, in this example, the elements and features similar to those previously shown and described will not be described in much further detail. In other words, differences between the present embodiment and the embodiment of FIG. 1 will be mainly described. Aftertreatment system 120 comprises a dCSC™ 122, an electrically heated catalyst (EHC) 123 downstream of dCSC™ catalyst 122, a selective catalytic reduction catalyst on a diesel particulate filter (SCR-F) 124 disposed downstream of dCSC™ 122, a downstream DOC 126 following SCR-F 124, a SCR catalyst (SCR) 128 following downstream DOC 126 and a controller 130.

Aftertreatment system 120 may further comprise a first reductant injector 132 disposed upstream of SCR-F 124 and a second reductant injector 134 disposed between second DOC 126 and SCR 128. In some embodiments, a first reductant decomposition tube 138 and a first mixer 140 may be positioned in an exhaust gas passage 136 sequentially to decompose urea to ammonia and then mix ammonia with the exhaust gas before the exhaust gas mixed with the ammonia enters SCR-F. Similarly, a second urea decomposition tube 144 and a second mixer 146 may be positioned sequentially in an exhaust gas passage 142 to decompose urea to ammonia and then mix ammonia with the exhaust gas.

dCSC™ 122 is an aftertreatment device containing diesel cold start concept technology (dCSC™) catalyst, which is configured to adsorb and store $NO_x$ and HC during the cold start period until the downstream catalytic devices reach their operating temperature when the stored $NO_x$/HC are released and converted. At the normal operating temperature, dCSC™ 122 acts as a diesel oxidation catalyst device.

EHC 123 is a device used to heat SCR-F 124 at cold start conditions to decrease the catalyst light off time.

Controller 130 is configured to control the first reductant injector 132 and the second reductant injector 134 to inject the reductant into the SCR-F 124 and the SCR 128, respectively, to achieve the desired system $NO_x$ conversion efficiency and the desired PM oxidation rate in the SCR-F. Controller 130 receives information from various sensors for use as inputs to the control algorithm. For examples, controller 130 is configured to receive temperature data from first temperature sensor 150 via a signal line 180, from second temperature sensor 152 via a signal line 182, from third temperature sensor 156 via a signal line 184, from fourth temperature sensor 158 via a signal line 186, and from fifth temperature sensor 162 via a signal line 188. Further, controller 130 is configured to receive $NO_x$ data/information from first $NO_x$ sensor 168 via a signal line 190 and from second $NO_x$ sensor 170 via a signal line 192. Further, controller 130 is configured to receive pressure data/information from pressure sensor 166 via a signal line 194. Further, controller 130 is configured to receive exhaust flowrate data/information detected by an air flowrate sensor 172 via a signal line 195 and a fuel flowrate sensor 173 via a signal line 197. Air flowrate sensor 172 and fuel flowrate sensor 173 are positioned at the engine inlet. Controller 130 determines the exhaust gas flowrate based on the air flowrate and the fuel flowrate. In some embodiments, controller 130 receives the information on the airflow rate from air flowrate sensor 172 and the fuel flowrate from fuel flowrate sensor 173 directly. In some embodiment, controller 130 receives the exhaust information from an engine control unit (ECU). Based on the determined first and second reductant flowrates, control 130 send control signals via signal lines 196 and 198 to first reductant injector 132 and second reductant injector 134, respectively for controlling the injection of the reductant. In some embodiments, control 130 is further configured to send a signal 199 to fuel doser 174 to control the fuel injection into dCSC™ 122.

Figure 3:
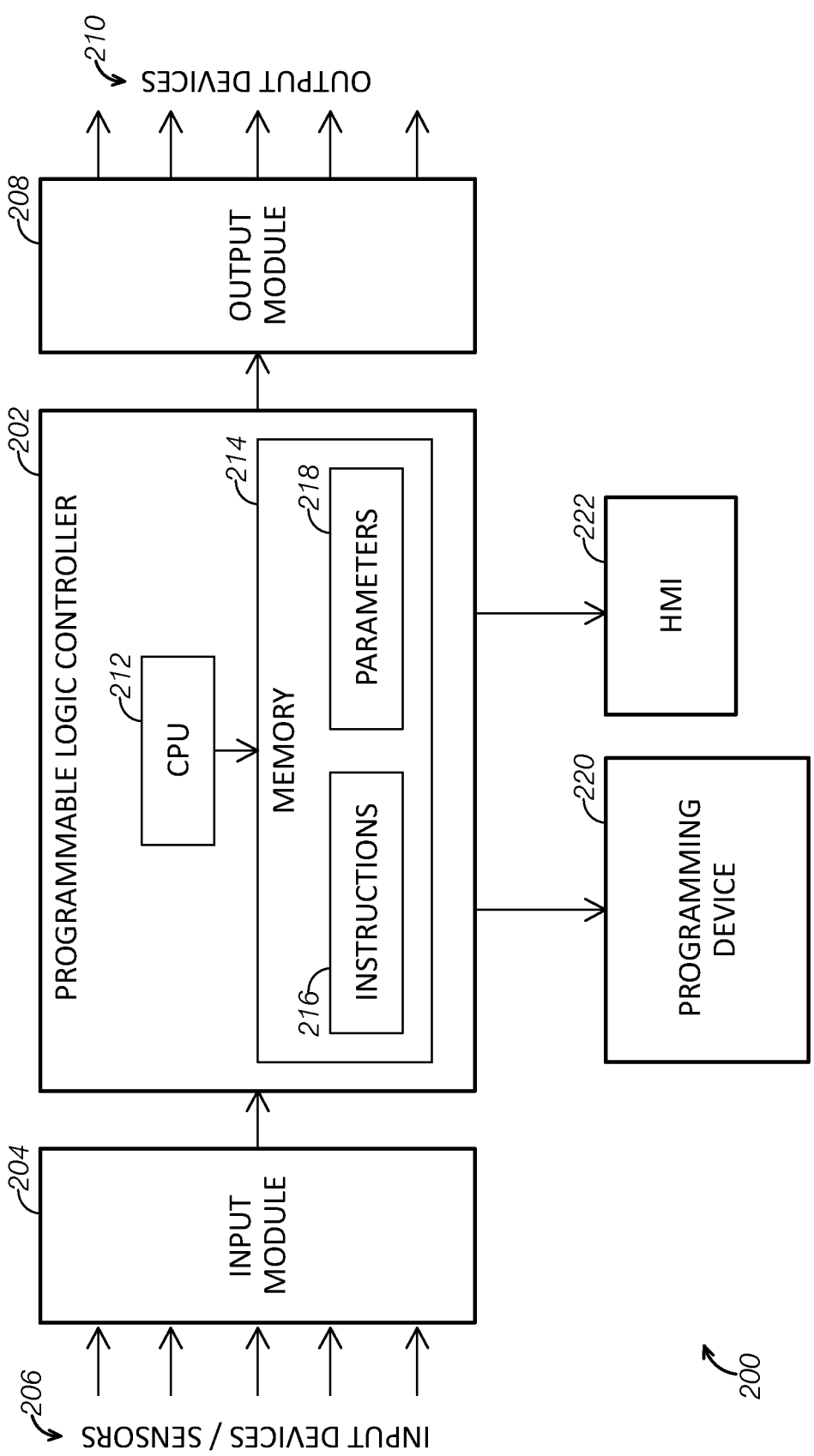
FIG. 3 shows an illustrative programmable logic controller system suitable for implementing aspects of aftertreatment control in accordance with the present disclosure.

FIG. 3 shows an illustrative programmable logic controller system 200 (also referred as a PLC system) suitable for implementing aspects of aftertreatment control in accordance with the present disclosure. Controller 30, 130 described above in association with the aftertreatment systems 20, 120 may be a programmable logic controller (PLC) as described in detail in FIG. 3. PLC system 200 is a programmable controller used for automation of typical industrial processes, and is an embodiment of data processing used for a control system for the aftertreatment systems of an engine. In some examples, devices that are embodiments of a PLC system may be included in the aftertreatment systems 20, 120 of the present disclosure.

In this illustrative example, PLC system 200 includes a programmable logic controller (PLC) 202, also referred to as a controller. PLC 202 includes a central processing unit (CPU) 212, and a memory 214 for storing instructions 216 and parameters 218 necessary to carry out the relevant automation tasks. Central processing unit 212 is an example of processor unit, and serves to execute software programs in the form of instructions 216. The software programs may be loaded into memory 214. Memory 214 may also store parameters 218 needed for operation. A programming device 220 may interface with PLC 202 to facilitate the input of instructions and settings and/or to monitor equipment operation. Programming device 220 may include, for example, a handheld computer or personal computer.

A human machine interface (HMI) 222 may also be placed in communication with PLC 202. HMI 222 facilitates a user-friendly and interactive interface with the system processes and controls. Human machine interface 222 may also assist an operator in determining machine conditions, in changing machine settings, and/or displaying faults. For example, the operator may be a user/driver of an engine who may be notified of the amount of reductant stored in a reductant tank by a display of HMI 222. In another example, a manufacturer of an engine may be authorized to set up a reductant flowrate according to the regulation requirements for $NO_x$ and PM emissions in a specific jurisdictions.

PLC system 200 includes an input module 204 in receiving communication with one or more input devices/sensors 206, and an output module 208 in outgoing communication with one or more output devices 210. Both modules 204 and 208 are hardware devices in communication with PLC 202. In some examples, communication with PLC 202 may be carried out via an optical (or otherwise wireless) interface, such that PLC WW02 is electrically isolated from the input and output modules.

Input module 204 may convert analog signals from input devices/sensors 206 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 208 may convert control signals from the CPU into digital or analog signals which may be used to control the various output devices.

HMI 222 and programming device 220 may provide for communications with other data processing systems or devices, e.g., through the use of physical and/or wireless communications links.

Modules 204 and 208 allow for input and output of data with other devices that may be connected to PLC 202. For example, input module 204 may provide a connection for temperature or pressure measurements, valve or machine status, tank level status, user input through a keyboard, a mouse, and/or any other suitable input device. In the aftertreatment systems 20, 120 described above, input devices/sensors 206 may include but not limited temperature sensors, PM sensor, pressure sensors, $NO_x$ sensors and flowrate sensors, a reductant level sensor, a fuel sensor, which communicate with the input module 204. Output module 208 may send output to reductant injectors, an actuator, indicator, motor controller, printer, machine, display, and/or any other suitable output device.

B. Illustrative Methods

Figure 4:
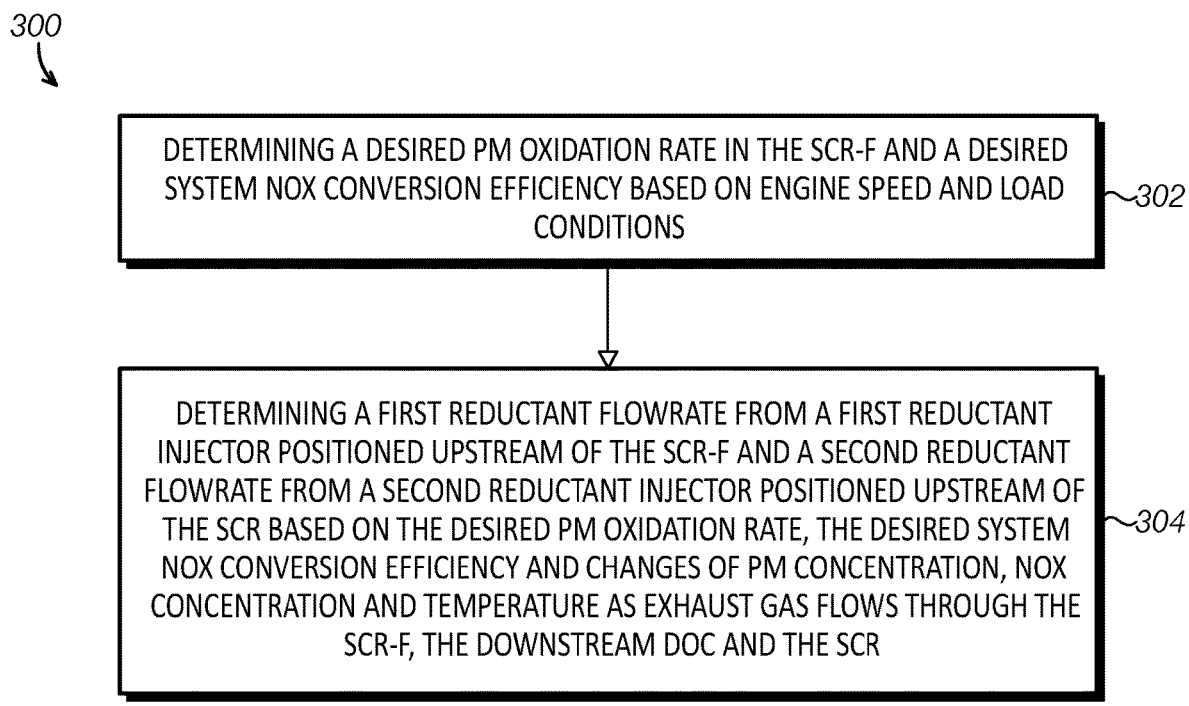
FIG. 4 shows a flow chart for a method to operate an aftertreatment system according to one aspect of the present disclosure.

This section describes steps of an illustrative methods 300, 400 for operating an aftertreatment system for a diesel engine; see FIGS. 3 and 4. Aspects of the aftertreatment system already described may be utilized in the method steps described below. Where appropriate, reference may be made to components and systems that may be used in carrying out each step. These references are for illustration, and are not intended to limit the possible ways of carrying out any particular step of the method.

FIG. 4 shows a flow chart illustrating a method 300 to operate an aftertreatment system according to one aspect of the present disclosure, and may not recite the complete process or all steps of the method. Method 300 may be used to operate aftertreatment system 20 in FIG. 1 and aftertreatment system 120 in FIG. 2. It should be appreciated that method 300 may be implemented in any appropriate aftertreatment system that includes a SCR-F, a SCR, a downstream DOC disposed between the SCR-F and the SCR, a first reductant injector configured to inject a reductant to the SCR-F and a second reductant injector configured to inject the reductant to the SCR. Method 300 may be executed by a control algorithm implemented in a controller of the aftertreatment system.

At 302, method 300 may include determining a desired PM oxidation rate in the SCR-F and a desired system $NO_x$ conversion efficiency based on engine speed and load conditions. The system $NO_x$ conversion efficiency refers to the difference of $NO_x$ in the exhaust gas discharged from the diesel engine and $NO_x$ in the exhaust gas discharged from the aftertreatment system. The PM oxidation refers to the PM reduction in the SCR-F.

At 304, method 300 may include determining a first reductant flowrate from a first reductant injector positioned upstream of the SCR-F and a second reductant flowrate from a second reductant injector positioned upstream of the SCR based on the desired PM oxidation rate, the desired system $NO_x$ conversion efficiency and changes of PM concentration, $NO_x$ concentration and temperature as exhaust gas flows through the SCR-F, the downstream DOC and the SCR. The changes of PM concentration, NOx concentration and temperature may be estimated by differential equations based on energy and mass conservation of species in the SCR-F, the downstream DOC and the SCR. The differential equations are described in detail below. Species concentrations (e.g., PM concentration and $NO_x$ concentration) at inlets and outlets of treatments devices such as a DOC, a SCR-F and SCR may be found by solving the differential equations at the engine speed and load conditions. In some embodiments, the inlet and outlet temperatures of the aftertreatment devices and inlet concentrations of the SCR-F and the SCR may be determined by temperature sensors and $NO_x$ sensors, respectively. By knowing the desired PM oxidation rate, the desired system $NO_x$ conversion efficiency and the operating temperatures of the aftertreatment devices, a first ammonia to $NO_x$ ratio to the SCR-F and a second ammonia to $NO_x$ ratio to the SCR can be determined.

Figure 5:
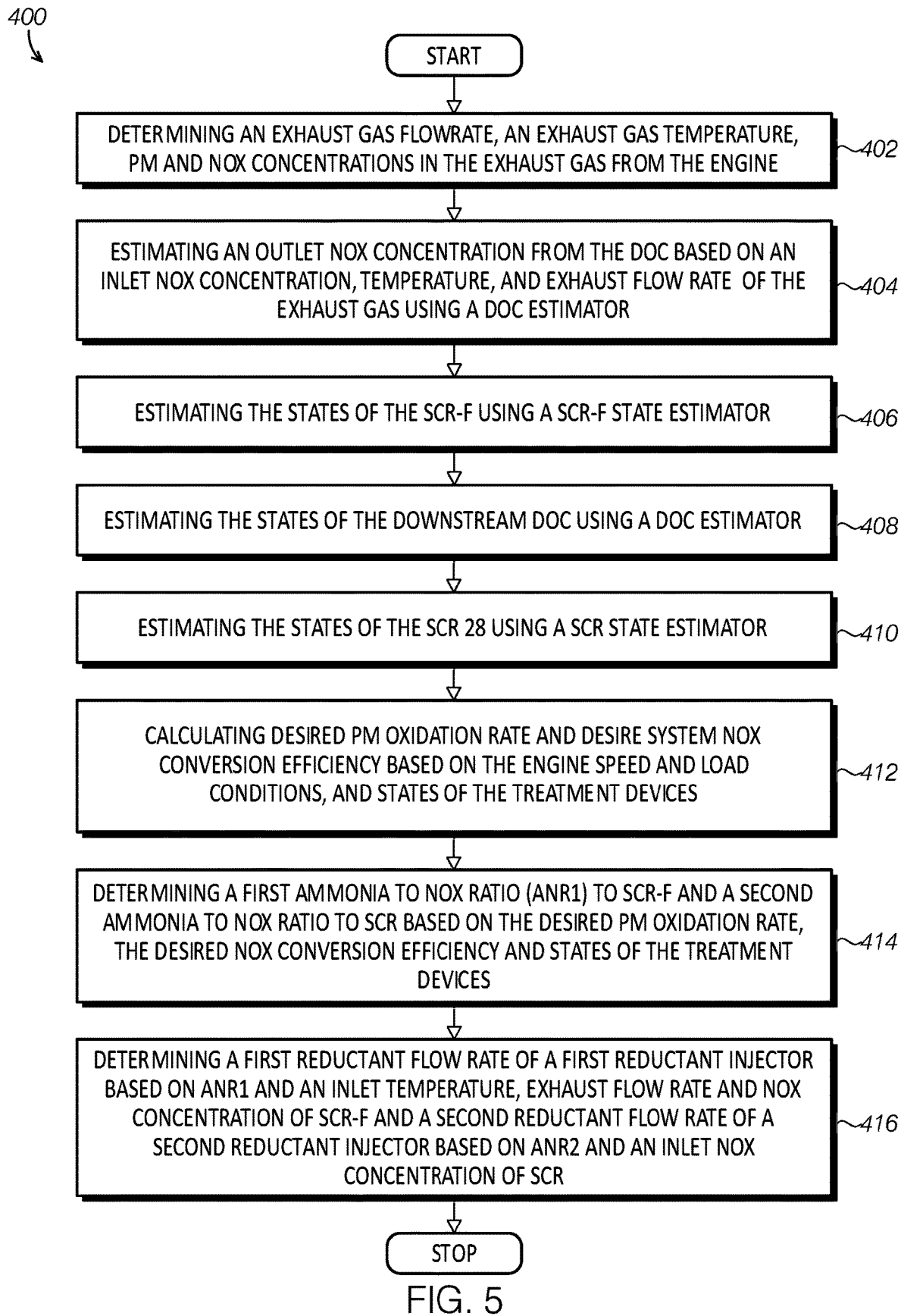
FIG. 5 is a flowchart illustrating steps performed in an illustrative method to operate an aftertreatment system of a diesel engine according to another aspect of the present disclosure.

FIG. 5 is a flowchart illustrating steps performed in an illustrative method 400 to operate an aftertreatment system of a diesel engine according to another aspect of the present disclosure, and may not recite the complete process or all steps of the method. It should be appreciated that other control system designs can be used with the disclosed aftertreatment system. Although various steps of method 400 are described below and depicted in FIG. 5, the steps need not necessarily all be performed, and in some cases may be performed simultaneously or in a different order than the order shown. Method 400 may be implemented in any appropriate aftertreatment system that includes a SCR-F, a downstream DOC following the SCR-F and the SCR following the downstream DOC, a first reductant injector configured to inject a reductant to the SCR-F and a second reductant injector configured to inject the reductant to the SCR. For example, method 400 may be implemented in the aftertreatment system 20 in FIG. 1 and the aftertreatment system 120. Method 400 may be executed by a control algorithm stored in a controller of the aftertreatment system. For illustration purposes, method 400 is described with reference to aftertreatment system 20. Method 400 can be used in aftertreatment 120 and other appropriate aftertreatment systems. For example, steps 412 and 416 of method 400 may be used in the aftertreatment systems including a SCR-F, a downstream DOC and a SCR.

Method 400 controls a first reductant flow from the first reductant injector and a second reductant flow from the second reductant injector to achieve desired PM oxidation rate and desired system $NO_x$ conversion efficiency. Based on the engine conditions and states of the aftertreatment devices at the given engine conditions, method 400 can determine the amount of ammonia injected into the SCR-F and the SCR, respectively for achieving the desired PM oxidation rate and the desired $NO_x$ conversion efficiency. In the example embodiment, the aftertreatment devices include a DOC downstream of the engine, a SCR-F, a downstream DOC following the SCR-F and a SCR following the downstream DOC. The states of the aftertreatment devices may include but are not limited to temperatures, PM concentrations and NOx concentrations of the exhaust gas flow as the exhaust gas flows through the SCR-F, the downstream DOC and the SCR, respectively Method 400 may use models for the treatment devices to estimate the species concentrations at the inlet and outlet of the aftertreatment devices such as the SCR-F, the downstream DOC and the SCR. Based on the estimated species concentrations and desired PM oxidation rate and desired system $NO_x$ conversion efficiency, a first reductant flowrate from a first reductant injector for the SCR-F and a second reductant flowrate from a second reductant injector for the SCR can be determined.

First, the characteristics of the exhaust gas from the engine are determined. At 402, method 400 may include determining an exhaust gas flowrate, an exhaust gas temperature, PM and $NO_x$ concentrations in the exhaust gas discharged from the engine. In some embodiments, the exhaust gas flowrate, the exhaust gas temperature, the PM and $NO_x$ concentrations may be estimated from an engine map for given engine speed and load conditions. In some embodiments, the exhaust gas flowrate may be determined by air and fuel flowrate sensors, the exhaust gas temperature may be measured by a temperature sensor, the PM and $NO_x$ concentrations may be measured by a PM sensor and a NOx sensor, respectively.

Figure 6:
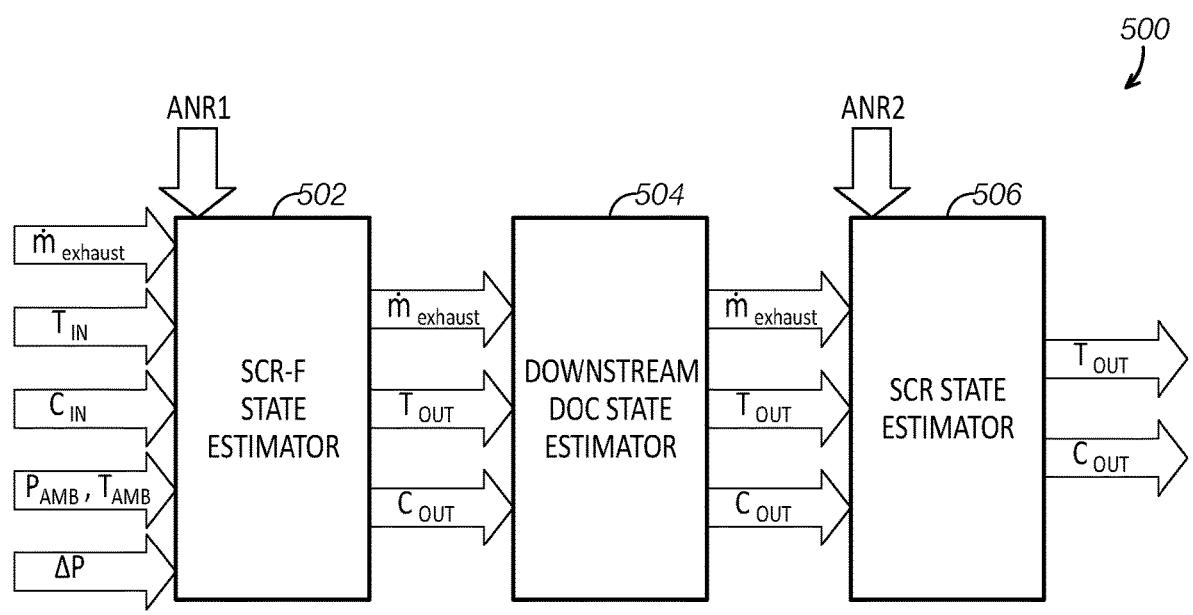
FIG. 6 is a system model for the aftertreatment systems of the present disclosure.

To operate the aftertreatment system or controlling flowrates of the reductant into the SCR-F and SCR, the states of the aftertreatment devices are estimated or determined by state estimators using appropriate models. State estimators may include mathematical models known or developed later to estimate the species concentrations in the aftertreatment system. In some embodiments, the aftertreatment system may be modeled using a combination of models for the individual aftertreatment devices. In some embodiments, the models may be run in Simulink in such a way that the output of the first model becomes the input for the next model. Referring to FIG. 6, a system model 500 is illustrated for an aftertreatment system including a SCR-F, a downstream DOC and SCR. The exhaust gas species concentrations change as the exhaust gas flows through each aftertreatment device. The variations in chemical species concentration is computed and tracked by the state estimators. Additionally, the state estimators estimate the states of PM mass retained, $NH_3$ coverage fraction and temperatures. The data from the state estimators are used by the control algorithm to control the PM oxidation rate in the SCR-F and system $NO_x$ conversion efficiency.

FIG. 6 illustrates a SCR-F state estimator 502, a downstream DOC state estimator 504 and a SCR state estimator 506. System model 500 may be used in the aftertreatment system 20, 120 and other appropriate aftertreatment system comprising a SCR-F, a downstream DOC and a SCR. The governing equations for the energy and chemical species mass balance for the state estimator are described below in association with steps 404 to 410 of method 400 in FIG. 4. It should be appreciated that alternative state estimators such as neural networks or other machine learning technique may be used to model the aftertreatment system of the present disclosure.

FIG. 6 shows the input data to the SCR-F state estimator include an exhaust gas flowrate $\dot{m}_{exhaust}$, an inlet temperature $T_{in}$ to the SCR-F, an inlet species concentrations $C_{in}$, an ambient air pressure $P_{amb}$, a pressure drop $\Delta P$ across the SCR-F and an ambient temperature $T_{amb}$. The exhaust gas flowrate $\dot{m}_{exhaust}$ may be determined by air and fuel flowrate sensors positioned at an inlet of the engine or estimated by a map for the engine speed and load conditions. The inlet temperature $T_{in}$ to the SCR-F may be measured by a temperature sensor disposed at an exhaust gas passage upstream of the SCR-F and close to an inlet of the SCR-F. The inlet species concentrations $C_{in}$ to the SCR-F include concentrations of $NO_x$ and PM. The inlet $NO_x$ concentration to SCR-F may be measured by a $NO_x$ sensor or may be estimated by a state estimator for an aftertreatment device upstream of the SCR-F. The ambient air pressure $P_{amb}$ and the ambient temperature $T_{amb}$ may be measured by the sensors. Another input data to the SCR-F state estimator is a first ammonia to $NO_x$ ratio ANR1, which may be determined dynamically or in real time based on the desired PM oxidation rate and the desired system $NO_x$ conversion efficiency. Based on the input data, the SCR-F state estimator calculates an outlet temperature $T_{out}$ of the SCR-F, an outlet species concentration $C_{out}$ such as an outlet $NO_x$ concentration of the SCR-F, the PM retained in the SCR-F, and other parameters needed to operate the aftertreatment system.

For the downstream DOC state estimator 504, the input data include the outlet temperature $T_{out}$ of the SCR-F and the outlet species concentration $C_{out}$, which may be the estimated data from the SCR-F state estimator. Alternatively, $T_{out}$ of the SCR-F or $T_{in}$ of the downstream DOC may be measured by a temperature sensor. Based on the input data, the downstream DOC state estimator calculates the outlet temperature $T_{out}$ and the outlet species concentration $C_{out}$ of the downstream DOC, and other parameters needed to operate the aftertreatment system.

For the SCR state estimator 506, the input data include the outlet temperature $T_{out}$ of the downstream DOC and the outlet species concentration $C_{out}$, of the downstream DOC, which may be the estimated data from the downstream state estimator. Alternatively, $T_{out}$ of the downstream DOC or $T_{in}$ of the SCR may be measured by a temperature sensor. Another input data to the SCR state estimator is a second ammonia to $NO_x$ ratio ANR2, which may be determined dynamically based on the desired PM oxidation rate and the desired system $NO_x$ conversion efficiency. Based on the input data, the SCR state estimator calculates the outlet temperature $T_{out}$ of the SCR, the outlet species concentration $C_{out}$ of SCR such as an outlet $NO_x$ concentration of the SCR, and other parameters needed to operate the aftertreatment system.

The state estimators of the aftertreatment devices allow the adjustment of the first reductant flowrate to the SCR-F and the second reductant flow rate to the SCR based on the real time operating conditions and performance of the aftertreatment devices. In this way, desired oxidation rate and desired system $NO_x$ conversion efficiency can be achieved.

Turning back to FIG. 5, at 404, method 400 may include estimating an outlet $NO_x$ concentration from the DOC 22 based on an inlet $NO_x$ concentration, temperature and exhaust rate of the exhaust gas using a DOC estimator. In some embodiments, an inlet temperature of the exhaust gas upstream of DOC 22 may be measured from a fifth temperature sensor 62 positioned on an exhaust gas passage upstream of DOC 22, an outlet temperature of the exhaust gas from DOC 22 may be measured by a first temperature sensor 50 positioned downstream of DOC 22 and the outlet $NO_x$ concentration from the DOC 22 may be determined by a state estimator from an engine map for engine given speed and load conditions.

The states of DOC 22 may be estimated by differential equations based on energy and mass conservation evaluation using the DOC state estimator. The DOC state estimator may use one or a two dimensional DOC model to simulate the change in $NO$, $NO_2$, HC and CO concentrations across DOC 22 along with the temperature rise in the exhaust gas due to energy release by the oxidation reactions. Equations 14 and 15 below represent the mass transfer from the channel gas stream to catalyst surface and the reactions taking place on the catalyst sites.

$$\epsilon \frac{\partial C_{g,i}}{\partial t} = -\epsilon u \frac{\partial C_{g,i}}{\partial x} - \beta_i A_g (C_{g,i} - C_{s,i}) \quad (14)$$

$$(1-\epsilon) \frac{\partial C_{s,i}}{\partial t} = -\beta_i A_g (C_{s,i} - C_{g,i}) - R_i \quad (15)$$

where:
$\epsilon$=Void fraction of catalyst;
u=Velocity of exhaust gas in the gas channel in m/s;
i=Index for chemical species (e.g., CO, NO, $NO_2$, $C_3H_6$);
$C_{g,i}$=Concentration of species i in gas phase in $kmol/m^3$;
$C_{s,i}$=Concentration of species i in solid phase in $kmol/m^3$;
$A_g$=Geometric surface area of catalyst surface in $m^3$;
$\beta_i$=Mass transfer coefficient of species;
$R_i$=Reaction rate of species i with catalyst;
Equations 16 and 17 below are used to compute the temperature change of the exhaust gas in one dimension across the DOC 22. Equation 17 contains the energy release from the oxidation reactions.

$$\rho C_v \frac{\partial T_g}{\partial t} = -\rho u C_p \frac{\partial T_g}{\partial t} - h_g \frac{4}{a_w}(T_g - T_w) \quad (16)$$

$$(\rho_s C_{p,s}) \frac{\partial T_w}{\partial t} = h_g \frac{4 a_w}{a_p^2 - a_w^2}(T_g - T_w) - h_a \frac{4 a_p}{a_p^2 - a_w^2}(T_g - T_w) + \frac{A_g}{(1-\epsilon)} \sum_{i=CO}^{HC} \frac{\Delta h_i r_i}{MW_i} \quad (17)$$

where
$\rho$=density of exhaust gas;
$\rho_s$=density of substrate.

The energy and chemical species mass balances in the DOC 22 can be described by equations (18) and (19) below.

$$T_{r,k} = T_{r,k-1} - \frac{\rho u c_p}{\rho_s c_s + \rho c_v} \frac{\Delta t}{\Delta x}(T_{r,k} - T_{r,k-1}) - \frac{A_g \Delta t}{(\rho_s c_s + \rho c_v)(1-\epsilon)} \sum_{i=CO}^{c_3 H_6} \frac{\Delta h_i RR_i}{MW_i} \quad (18)$$

$$C_{i,r} = C_{i,r-1} - \frac{\Delta x}{\epsilon u} RR_i \quad (19)$$

where:
$T_{r,k}$, $T_{r,k-1}$=Exhaust gas temperature at axial location r at time k and k−1 seconds;
$\Delta t$, $\Delta x$=Time in seconds and axial distance in meters;
$\rho$, $\rho_s$=Density of exhaust gas and substrate in $kg/m^3$;
$c_s$, $c_v$=Specific heat of substrate and exhaust gas in kJ/kg·K;
$A_g$=Geometric surface area in $m^3$, $\epsilon$=Void fraction of the catalyst;
i=Index for chemical species;
RR=reaction rate in kmol/s;
$\Delta h$=Heat of formation of a given reaction in kJ/kmol;
$MW_l$=Molecular weight of species l;
$C_{i,r}$, $C_{i,r-1}$=Concentration of chemical species i at location r and r−1 in $kmol/m^3$; and
u=Velocity of exhaust gas in the channel in m/s.

Equation (18) represents the energy conservation of the exhaust gas flowing through DOC 22 in order to calculate the temperature of the substrate. To calculate the temperature of the substrate, the heat capacity of DOC 22 and exhaust gas is taken into account in the first term and energy release by the HC oxidation reaction is added to the substrate temperature in the second term. The substrate temperature from Equations (18) is used in the reaction rate calculation to calculate NO, $NO_2$, CO and HC concentrations as the chemical species flow through DOC 22.

Via the DOC state estimator, method 400 can estimate NO and $NO_2$ concentrations or the inlet $NO_x$ concentration to the SCR-F can be obtained.

Next, at 406, method 400 may include estimating the states of the SCR-F using a SCR-F state estimator. In some embodiments, method 400 may estimate an outlet $NO_x$ concentration and $NH_3$ concentration from the SCR-F, PM oxidation rate, PM retained and/or $NH_3$ coverage fraction based on an inlet and an outlet temperatures of the exhaust gas of SCR-F 24 and a pressure difference across the SCR-F. The inlet temperature of the exhaust gas of SCR-F 24 may be measured or detected by first temperature sensor 50 and the outlet temperature of SCR-F 24 may be measured by second temperature sensor 52. The pressure difference may be measured by pressure sensor 66. In some embodiments, a two-dimension (2D) SCR-F state estimator may be used to estimate the states of the SCR-F. The 2D SCR-F model can simulate the internal states of 2D temperature, PM mass retained and $NH_3$ coverage fraction distributions. A two-site model with the first site participating in selective catalyst reduction reactions and storage, and the second site participates only in storage has been used. The reactions (17)-(24) described above and below may be used by the SCR-F state estimator. A reaction diffusion scheme has been used to simulate the change in NO, $NO_2$ and $NH_3$ concentrations due to the SCR and PM oxidation reactions across the PM cake and substrate wall layers. Forward diffusion of $NO_2$ between the PM cake and substrate wall layers and the resultant 70% reduction in $NO_2$ assisted PM oxidation rate due to SCR reactions are modeled. The inhibition in SCR reactions due to the decrease in mass transfer caused by PM in the substrate wall is also taken into account. Equations (20) to (24) represent the governing equations for species conservation in the inlet/outlet channels, substrate wall and ammonia storage on the two storage sites.

$$\frac{dC_{1,l}}{dt} = -v_1 \frac{dC_{1,l}}{dx} + \left(\frac{4}{a}\right) k_1 (C_{1s,l} - C_{1,l}) + \left(\frac{4}{a}\right) v_f C_{1,l} \quad (20)$$

$$\frac{dC_{f,l}}{dt} = -v_f \frac{dC_{f,l}}{dy} + \left(\frac{d}{dy}\right)\left(D_l \frac{dC_{f,l}}{dy}\right) - \sum k \zeta_{l,m} R_m \quad (21)$$

$$\frac{dC_{2,l}}{dt} = -v_2 \frac{dC_{2,l}}{dx} + \left(\frac{4}{a}\right) k_2 (C_{2,l} - C_{2s,l}) + \frac{4}{a} v_f C_{2s,l} \quad (22)$$

where:
l=Species index;
m=Index for reactions;

$C_{1,l}$=Concentration of species in the inlet channel in kmol/m³;
$C_{1s,l}$=Concentration of species in the inlet channel—concentration of species at the wall boundary in kmol/m³;
$C_{2,l}$=Concentration of species in the outlet channel in kmol/m³;
$C_{2s,l}$=Concentration of species at the outlet channel—concentration of species at the wall boundary in kmol/m³;
$C_{f,l}$=Concentration of species 1 in wall and PM cake in kmol/m³;
$v_1$, $v_2$, $v_f$=Exhaust gas velocity in inlet channel, outlet channel, substrate wall in m/s;
a=Channel width in m;
$k_1$, $k_2$=Mass transfer coefficient in inlet channel, outlet channel;
$D_l$=Diffusion rate of species 1 in m²/2;
$R_m$=Reaction rate;
$\zeta_{l,m}$=Stoichiometric coefficient;

$$\frac{d\theta_1}{dt} = \frac{(R_{ads,1} - R_{des,1} - 4R_{std} - 4R_{slo} - 4R_{oxid})}{\Omega_1} \quad (23)$$

$$\frac{d\theta_2}{dt} = \frac{(R_{ads,2} - R_{des,2})}{\Omega_2} \quad (24)$$

where:
$\theta_1$, $\theta_2$=Coverage fraction of NH₃ storage site 1, storage site 2;
$R_{ads,1}$, $R_{ads,2}$=Adsorption reaction rate at site 1, site 2;
$R_{des,1}$, $R_{des,2}$=Desorption reaction rate at site 1, site 2;
$R_{std}$=Standard SCR reaction rate;
$R_{fst}$=Fast SCR reaction rate;
$R_{slo}$=Slow SCR reaction rate;
$R_{oxid}$=NH₃ oxidation reaction rate;
$\Omega_1$, $\Omega_2$=Maximum storage capacity of NH₃ storage site 1, storage site 2;

$$\rho_g C_v V_1 \frac{dT_1}{dt} = \dot{m}_{1,in} c_p(T_{1,i-1} - T_{1,i}) - \dot{m}_f c_p(T_{1,i-1} - T_{1,i}) + \dot{Q}_1 \quad (25)$$

$$(\rho_c C_c V_c + \rho_w C_w V_w) \frac{dT_f}{dt} = \dot{m}_f c_p(T_{1,i-1} - T_{f,i}) + \dot{Q}_f \quad (26)$$

$$\rho_g C_v V_2 \frac{dT_2}{dt} = \dot{m}_{2,in} c_p(T_{2,i-1} - T_{2,i}) + \dot{m}_f c_p(T_{f,i} + T_{2,i}) + \dot{Q}_2 \quad (27)$$

where:
$\rho_g$, $\rho_c$, $\rho_w$=Density of exhaust gas, density of PM cake, density of substrate wall in kg/m³;
$C_v$, $C_c$, $C_w$=Constant volume specific heat of exhaust gas, cake, substrate wall in kJ/kg·K;
$V_1$, $V_f$, $V_2$=Volume of inlet channel, filter, outlet channel in m³;
$\dot{m}_{1,in}$, $\dot{m}_{2,in}$=Mass flow rate of inlet channel, in outlet channel in kg/s;
$c_p$=Constant pressure specific heat of exhaust gas;
$T_1$, $T_2$=Temperature in the inlet channel, outlet channel in K;
$\dot{Q}_1$, $\dot{Q}_2$, $\dot{Q}_f$=Convection heat transfer rate in inlet channel, outlet channel, filter in kJ/s;

The above equations can be solved to obtain the states of the SCR-F as represented in equations (28)-(35) below.

$$T_{r,k} = T_{r,k-1} - \frac{\dot{Q}_{cond,axial} + \dot{Q}_{cond,radial} + \dot{Q}_{conv} + \dot{Q}_{reac,PM} + \dot{Q}_{HC} + \dot{Q}_{SCR}}{(\rho_s c_s V_s + \rho_f c_f V_f)} \quad (28)$$

$$C_{i,r} = C_{i,r-1} - \frac{D_i}{\Delta y}(C_{i,r-1} - C_{i-1,r-1}) - \frac{\Delta y}{v_w} RR_i \quad (29)$$

$$\theta_{1,k} = \theta_{1,k-1} + \frac{\sum_{k=ads,1}^{SCRoxid} \eta_k RR_k}{\Omega_1} \quad (30)$$

$$\theta_{2,k} = \theta_{2,k-1} + \frac{\sum_{k=ads,2}^{des,2} \eta_k RR_k}{\Omega_2} \quad (31)$$

$$(\Delta P_{total})_k = (\Delta P_{channel} + \Delta P_{wall} + \Delta P_{cake})_k \quad (32)$$

$$\dot{m}_{c,retained} = \eta_{cake} \dot{m}_{in} - \dot{m}_{c,oxid} \quad (33)$$

$$\dot{m}_{w,retained,n} = \eta_{wall,n} \dot{m}_{slab,n-1} - \dot{m}_{w,oxid,n} \quad (34)$$

$$\dot{m}_{in,PM} = \left(\frac{\dot{m}_{exhaust}}{\rho_{exhaust}}\right) \times \left(\frac{C_{PM}}{1e-6}\right) \times \left(\frac{T_{ref}}{T_{exhaust}}\right) \quad (35)$$

where:
$\Delta y$=Axial distance in y direction in meters
$\rho_f$, $\rho_s$=Density of PM cake and substrate in kg/m³;
$V_f$, $V_s$=Volume of PM cake and substrate in m³;
$c_f$, $c_s$=Specific heat of PM cake and substrate in kJ/kg·K;
$\eta$=Stoichiometric coefficient;
$\dot{Q}_{cond,axial}$, $\dot{Q}_{cond,radial}$, $\dot{Q}_{conv}$=Heat transfer by conduction in axial, radial direction and convection in kJ/s;
$\dot{Q}_{reac,PM}$, $\dot{Q}_{reac,HC}$, $\dot{Q}_{reac,SCR}$=Energy release by PM, HC oxidation and SCR reactions in kJ/s; $D_i$=Diffusivity of chemical species i in m²/s;
$v_w$=Velocity of exhaust gas in the channel in m/s;
k=Index for reactions (adsorption, desorption, Standard, fast and slow SCR, NH₃ oxidation reactions;
$\theta_1$, $\theta_1$=Coverage fraction of first and seconds NH₃ storage sites;
$\Omega 1$, $\Omega 2$=Maximum storage capacity of first NH₃ and second NH₃ storage sites in kmol/m³;
$\Delta P_{total}$=total pressure drop across the SCR-F in kPa;
$\Delta P_{channel}$, $\Delta P_{wall}$, $\Delta P_{cake}$=Pressure drop in the inlet/outlet channels, substrate wall and PM cake;
$\dot{m}_{c,retained}$, $\dot{m}_{w,retainea,n}$=Rate of PM mass retained in the PM cake and wall slab n in the SCR-F in (kg/s);
$\eta_{cake}$, $\eta_{wall,n}$=Filtration efficiency of PM cake and wall slab n;
$\dot{m}_n$, $\dot{m}_{slab,n-1}$=PM mass flow rate into PM cake and given wall slab n in kg/s;
$\dot{m}_{c,oxid}$, $\dot{m}_{w,oxid,n}$=PM oxidation rate in the PM cake and wall slab n in kg/s;
$\dot{m}_{exhaust}$=Actual mass flow rate of exhaust in kg/s;
$\dot{m}_{n,PM}$=Rate of PM mass into the SCR-F kg/s;
$\rho_{exh}$=Density of exhaust gas in kg/actual m³;
$C_{PM}$=Concentration of PM in mg/scm;
$T_{exhaust}$, $T_{std}$=Exhaust gas and ambient standard air temperature in K.

The system of coupled equations (28) to (35) are solved in a 2D mesh in the SCR-F model to compute all the relevant states and outputs including temperature of filter, outlet concentrations, NH₃ coverage fraction of the two NH₃ storage sites, PM mass retained in the PM cake, substrate wall and pressure drop across the SCR-F.

Next, at 408, method 400 may include estimating the states of the downstream DOC 26 using a DOC estimator. In some embodiments, method 400 may estimate an outlet NO$_x$ concentration based on inlet and outlet temperatures of the exhaust gas of the downstream DOC 26. In some embodiments, the inlet and outlet temperatures may be measured by second temperature 52 sensor positioned at an exhaust gas passage between the SCR-F 24 and DOC 26 and third temperature sensor 56 positioned on an exhaust gas passage between the downstream DOC 26 and SCR 28. The downstream DOC state estimator may use the algorithm the same as that used for modeling the DOC 22. A $NO_x$ sensor may be positioned at an exhaust gas passage upstream of the downstream DOC 26 to validate the outlet NOx concentration from the SCR-F estimated by the SCR-F estimator model.

Next, at 410, method 400 may include estimating the states of the SCR 28 using a SCR state estimator. In some embodiments, method 400 may estimate an outlet $NO_x$ and $NH_3$ concentrations and $NH_3$ coverage fraction based on inlet and outlet temperatures of the exhaust gas of the SCR 28. In some embodiments, the inlet and outlet temperatures may be measured by third temperature sensor 56 positioned at the exhaust gas passage between the downstream DOC 26 and the SCR 28 and fourth temperature sensor 58 positioned at an exhaust gas passage downstream of the SCR 28, respectively.

In some embodiments, a one-dimension SCR model may be used to estimate the states of the SCR 28. This model employs a two-site storage model with SCR reactions (4)-(13). The resultant model based on species conservation equations in equations 22 to 24 is capable of simulating the outlet NO, $NO_2$ and $NH_3$ concentrations to within +/−20 ppm of experimental values.

$$\epsilon \frac{\partial C_{g,i}^n}{\partial t} = -u \frac{\partial C_{g,i}^n}{\partial x} - \beta_i A_g (C_{g,i}^n - C_{s,i}^n) \quad (36)$$

$$(1-\epsilon) \frac{\partial C_{s,i}^n}{\partial t} = \beta_i A_g (C_{g,i}^n - C_{s,i}^n) - \sum_i N_{i,j} R_j \quad (37)$$

where:
∈=Void fraction of catalyst;
u=Velocity of exhaust gas in the gas channel in m/s;
i=Index for chemical species (e.g., NO, $NO_2$, $NH_3$);
j=Index for species (e.g., ads, des, fast SCR, standard SCR, slow SCR, $NH_3$ oxid., $N_2O$)
$C_{g,i}^n$=Concentration of species i in gas phase in $kmol/m^3$ at time n;
$C_{s,i}^n$=Concentration of species i in solid phase in $kmol/m^3$;
$A_g$=Geometric surface area of catalyst surface in $m^2$;
$\beta_i$=Mass transfer coefficient of species;
$N_{i,j}$=Molar flux of species i in $kmol/s \cdot m^2$
$R_j$=Reaction rate of species j;

$$\Omega_1 \dot{\theta}_1 = R_{Ads,1} - R_{Des,1} - \Sigma_j N_j R_j \quad (38)$$

$$\Omega_2 \dot{\theta}_2 = R_{Ads,2} - R_{Des,2} \quad (39)$$

where:
$\theta_1$, $\theta_2$=Coverage fraction of $NH_3$ storage site 1, storage site 2;
$R_{ads,1}$, $R_{ads,2}$=Adsorption reaction rate at site 1, site 2;
$R_{des,1}$, $R_{des,2}$=Desorption reaction rate at site 1, site 2;
$\Omega_1, \Omega_2$=Maximum storage capacity of $NH_3$ storage site 1, storage site 2;
j=Index for species (e.g., ads, des, fast SCR, standard SCR, slow SCR, $NH_3$ oxid., $N_2O$)
$N_j$=Molar flux of species j in $kmol/s \cdot m^2$
$R_j$=Reaction rate of species j.

The equations can be solved for the states of the SCR 28 as described in equation (27) to (30).

$$T_{r,k} = T_{r,k-1} - \frac{\rho u C_p}{\rho_s c_s + \rho C_v} \frac{\Delta t}{\Delta x}(T_{r,k} - T_{r,k-1}) - \quad (40)$$
$$h_a \frac{4 a_w \Delta t}{(\rho_s c_s + \rho C_v)(a_p^2 - a_w^2)}(T_{r,k-1} - T_a)$$

$$C_{i,r} = C_{i,r-1} - \frac{\Delta x}{\epsilon u} RR_i \quad (41)$$

$$\theta_{1,k} = \theta_{1,k-1} + \frac{\sum_{k=ads,1}^{SCRoxid} \eta_k RR_k}{\Omega_1} \quad (42)$$

$$\theta_{2,k} = \theta_{2,k-1} + \frac{\sum_{k=ads,2}^{des,2} \eta_k RR_k}{\Omega_2} \quad (43)$$

where:
$h_a$=Convection heat transfer coefficient to the ambient in $W/m^2 K$;
$a_w$=Geometric surface are in $m^2$;
$T_a$=Ambient temperature;
$a_p$, $a_w$=Width of monolith and open channel in m.

The system of coupled equations (40) to (43) are solved to compute all substrate temperatures, $NH_3$ coverage fraction for the two $NH_3$ storage sites and the outlet concentrations of $NO_x$ (NO, $NO_2$ and $NH_3$).

Next, at 412, method 400 may include calculating desired PM oxidation rate and desire system $NO_x$ conversion efficiency based on the engine speed and load conditions, and states of the aftertreatment devices. The system $NO_x$ conversion efficiency is a percentage of $NO_x$ removed after the exhaust gas flows through the aftertreatment systems, which is defined as a percentage of an amount of $NO_x$ removed over an amount of $NO_x$ in the exhaust gas from the engine.

Next, at 414, method 400 may include determining a first ammonia to $NO_x$ ratio (ANR1) to SCR-F 24 and a second ammonia to $NO_x$ ratio ANR2 to SCR 28 based on the desired PM oxidation rate, the desired system $NO_x$ conversion efficiency and states of the aftertreatment devices (e.g., DOC 22, SCR-F 24, downstream DOC 26 and SCR 28).

Next, at 416, method 400 may include determining a first reductant flow rate $\dot{m}_{def,1}$ of a first reductant injector based on ANR1 and an inlet temperature, exhaust flow rate and $NO_x$ concentration of SCR-F 24 and a second reductant flow rate $\dot{m}_{def,2}$ of a second reductant injector based on ANR2 and an inlet $NO_x$ concentration of SCR 28. The inlet $NO_x$ concentration of SCR-F 24 may be determined by a $NO_x$ sensor positioned upstream of SCR-F or estimated by the DOC state estimator. The inlet $NO_x$ concentration of SCR 28 may be determined by a second $NO_x$ sensor positioned at an exhaust gas passage upstream of the SCR (e.g., the second $NO_x$ sensor 70 in FIG. 1). Diesel exhaust fluid (DEF) is often used as the reductant in the SCR devices for diesel engines. DEF is an aqueous urea solution made with 32.5% urea and 67.5% deionized water. When DEF is used as the reductant, a first reductant flow rate or a first DEF flowrate $\dot{m}_{DEF1}$ may be determined by equations (44) and (45) as follows:

$$\dot{m}_{DEF1} = \frac{\dot{m}_{exh} \times MW_{urea} \times ANR_1 \times 10^{-6} \times NO_{x,1}}{0.325 \times 2 \times MW_{exh} \times \rho_{DEF}} \quad (44)$$

$$MW_{exh} = \sum_{1}^{4} Y_i \times MW_i \quad (45)$$

Where $\dot{m}_{exh}$=exhaust flowrate of exhaust from engine (kg/s);
$\dot{m}_{DEF1}$=DEF mass flowrate (ml/s) from the first reductant injector;
$MW_{urea}$=Molecular weight of urea (kg/kmol)=60.06 kg/kmol;
$ANR_1$=Ammonia to NOx ratio to SCR-F 24;
$NO_{x,1}$=NOx concentration the inlet of the SCR-F 24 (ppm);
MWexh=Molecular weight of the exhaust gas (kg/kmol);
$\rho_{DEF}$=Density of DEF (kg/m$^3$)=1080 kg/m$^3$;
$MW_i$=Molecular weight of species i (kg/kmol); and
Y=Mole fraction for species $CO_2$, $O_2$, $H_2O$ and $N_2$ (kmol of species i/kmol of exhaust).

Similarly, a second reductant flow rate or a first DEF flowrate $\dot{m}_{DEF2}$ (kg/s) may be determined by equation (46)-(47) as follows:

$$\dot{m}_{DEF2} = \frac{\dot{m}_{exh} \times MW_{urea} \times ANR_2 \times 10^{-6} \times NO_{x,2}}{0.325 \times 2 \times MW_{exh} \times \rho_{DEF}} \quad (46)$$

$$MW_{exh} = \sum_1^4 Y_i \times MW_i \quad (47)$$

where:
$\dot{m}_{DEF2}$=DEF mass flowrate (ml/s) from the second reductant injector;
$ANR_2$=Ammonia to NOx ratio to SCR 28;
$NO_{x,2}$=NOx concentration at the inlet of the SCR-F 24 (ppm).

C. Model Simulation Results of Aftertreatment Systems of the Present Disclosure Models described above are used to simulate the aftertreatment systems of the present disclosure and known aftertreatment systems to illustrate the performance of the aftertreatment systems of the present disclosure.

FIG. 7 shows Table 1 which lists the specifications of exemplary treatments devices of the aftertreatment system of the present disclosure. The aftertreatment devices includes a DOC, a SCR-F, a downstream DOC (DOC$_2$) and a SCR for the experiment or the simulation. The specifications include various characteristics of the substrate and catalyst, and physical structures of the substrate and cells as shown in the Table 1.

FIG. 8 shows Table 2 which lists the conditions for test points A, C, E, B, D and 1 for model simulation/experiments. The conditions include an exhaust gas flowrate, a SCR-F inlet temperature, a SCR-F inlet $NO_2$, a SCR-F inlet $NO_x$, a SCR-F inlet $NO_2/NO_x$ and a SCR-F inlet ammonia to $NO_x$ ratio ANR1. Model simulation results for an engine condition at Test C are shown in FIGS. 9A-9C, FIG. 10, FIGS. 11A-11C and FIGS. 15A-15C.

Figure 9A:
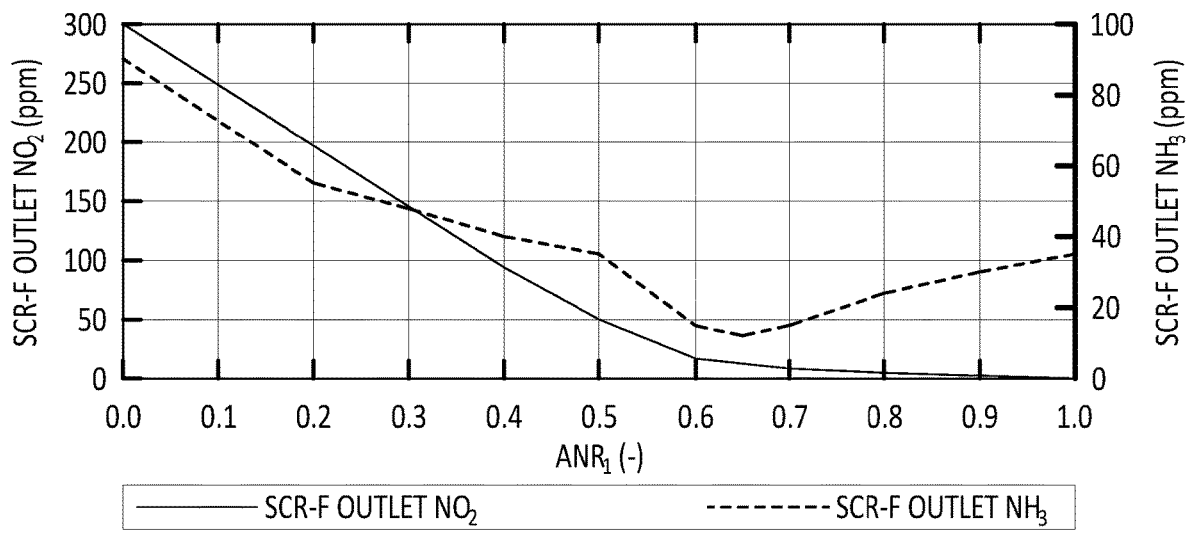
FIG. 9A shows the change in the system $NO_x$ conversion efficiency and a second ammonia to $NO_x$ ratio ANR2 as a function of a first ammonia to $NO_x$ ratio ANR1 for an aftertreatment system comprising a SCR-F, downstream DOC and SCR.
Figure 9B:
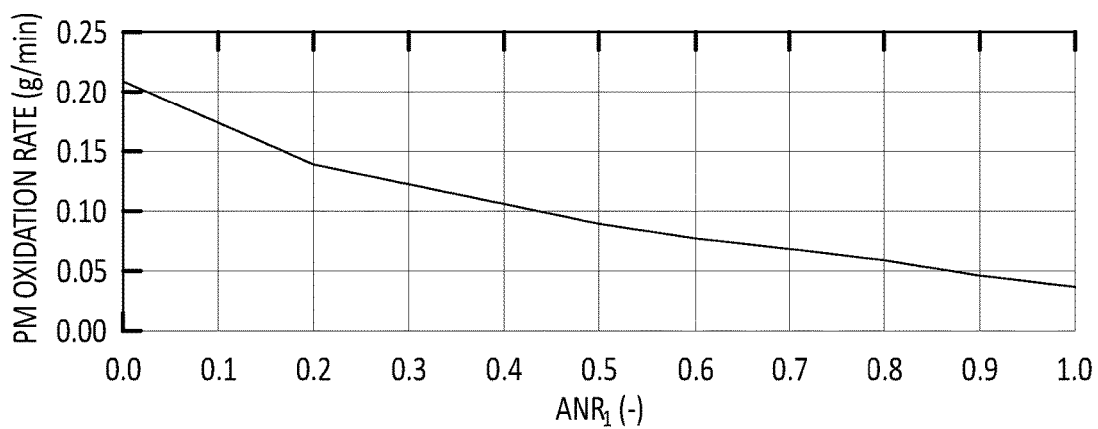
FIG. 9B shows the change in PM oxidation rate in the SCR-F as a function of a first ammonia to $NO_x$ ratio ANR1 for an aftertreatment system comprising a SCR-F, downstream DOC and SCR.
Figure 9C:
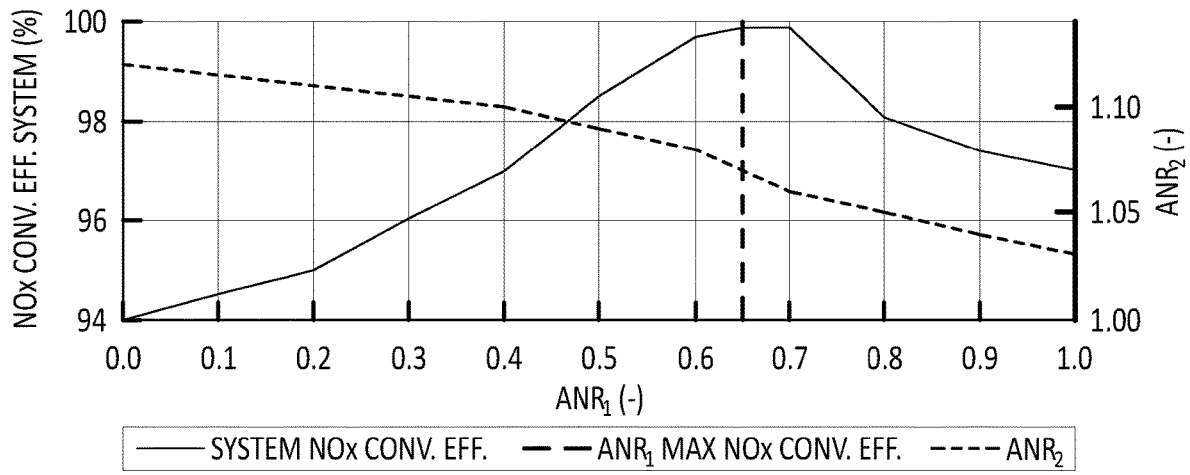
FIG. 9C shows the change in the SCR-F outlet $NO_2$ and a SCR outlet $NH_3$ as a function of a first ammonia to $NO_x$ ratio ANR1 for an aftertreatment system comprising a SCR-F, downstream DOC and SCR.

FIG. 9A shows the change in the SCR-F outlet $NO_2$ and a SCR outlet $NH_3$ as a function of a first ammonia to $NO_x$ ratio ANR1 for an aftertreatment system comprising SCR-F, downstream DOC and SCR. FIG. 9B shows the change in PM oxidation rate in SCR-F as a function of a first ammonia to $NO_x$ ratio ANR1 for an aftertreatment system comprising SCR-F, downstream DOC and SCR. FIG. 9C shows the change in the system $NO_x$ conversion efficiency and a second ammonia to $NO_x$ ratio ANR2 as a function of a first ammonia to $NO_x$ ratio ANR1 for an aftertreatment system comprising SCR-F, downstream DOC and SCR. In the experiment, ANR2 was determined in such a way that the total reductant flowrate is maintained constant.

As shown in FIG. 9A, the outlet SCR-F $NO_2$ concentrations decreases with an increase in ANR1. When ANR1 is greater than 0.65, the outlet SCR-F $NO_2$ concentrations is less than 15 ppm. The SCR outlet $NH_3$ decreases as the ANR1 increase until ANR1=0.65. The highest system $NO_x$ conversion was observed at ANR1=0.65 as shown in FIG. 9C. The SCR outlet $NH_3$ increases beyond ANR1=0.65.

As shown in FIG. 9B, the PM oxidation rate decreases with an increase in ANR1. The reduced PM oxidation rate is due to the forward diffusion of the $NO_2$ from the PM cake to the substrate wall in the SCR-F as ANR1 value increases.

As shown in FIG. 9C, the system $NO_x$ conversion efficiency increases from ANR1=0.0 to 0.65 and reaches a maximum value of 99.9% at ANR1=0.65. ANR2 decreases with increase in ANR1.

The experiments show that ANR1 and ANR2 for the aftertreatment system can be controlled or adjusted to achieve desired PM oxidation rate and system $NO_x$ conversion efficiency at certain engine conditions. For example, ANR1 may be adjusted to be less than a certain value or less than a predetermined threshold (e.g., ANR1 less than 0.65 in this engine condition) to increase the PM oxidation rate if a lower system $NO_x$ conversion efficiency is acceptable. In another example, ANR1 may be controlled to be not greater than a certain value or a predetermined threshold (e.g., not greater than 0.65 in this engine condition) because neither system $NO_x$ conversion efficiency nor PM oxidation rate is improved above the predetermined threshold.

Figure 10:
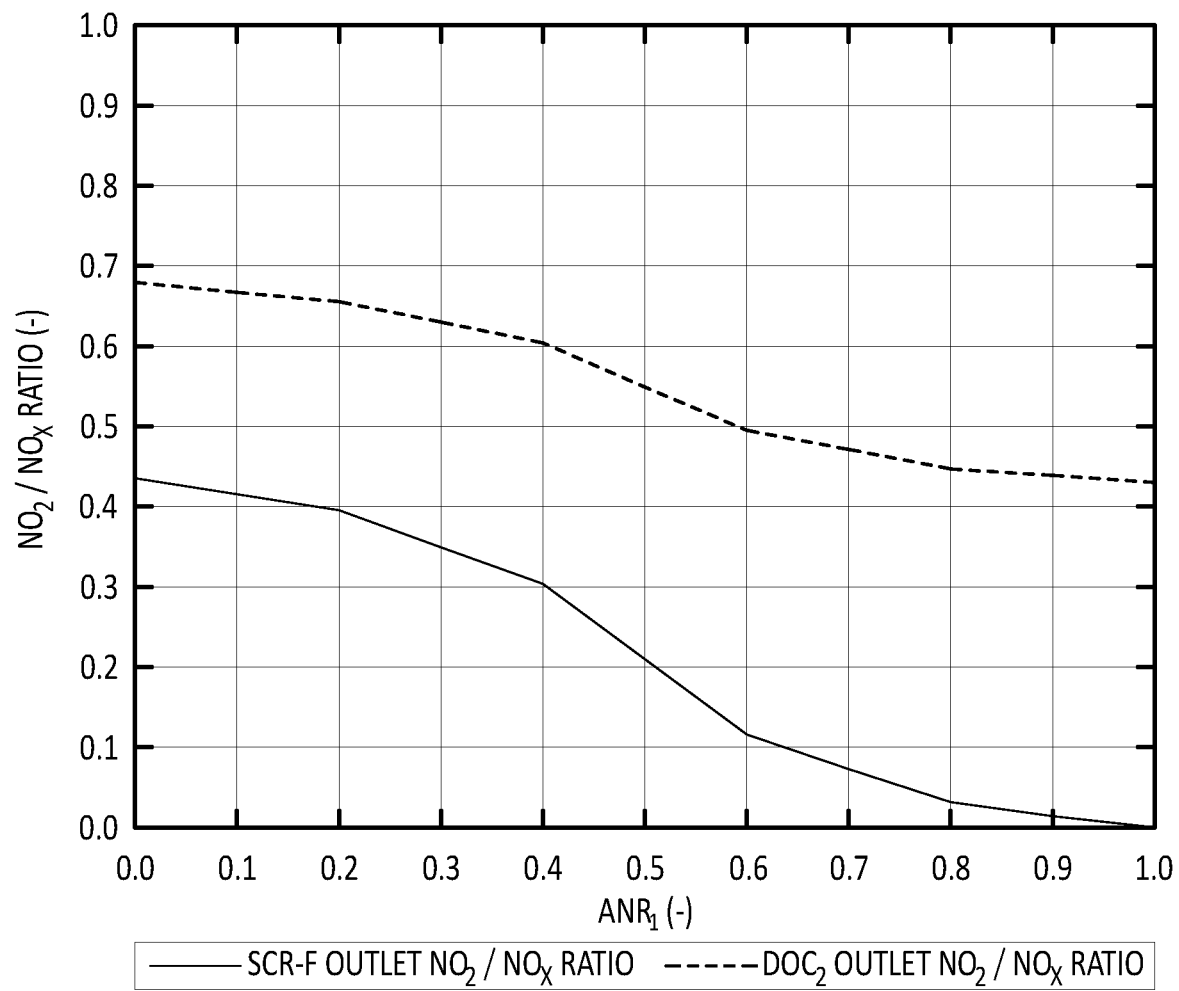
FIG. 10 shows the changes of the SCR-F outlet $NO_2/NO_x$ and downstream DOC outlet $NO_2/NO_x$ with ANR1 for an aftertreatment system comprising a SCR-F, downstream DOC and SCR.

FIG. 10 shows the changes of SCR-F outlet $NO_2/NO_x$ and downstream DOC outlet $NO_2/NO_x$ with ANR1 for an aftertreatment system comprising SCR-F, downstream DOC and SCR. As can be observed from FIG. 10, the addition of downstream DOC in the aftertreatment system leads to higher $NO_2/NO_x$ ratio before the SCR compared to an aftertreatment system without the downstream DOC because the downstream DOC outlet $NO_2/NO_x$ is the inlet $NO_2/NO_x$ for the SCR. The increased outlet $NO_2/NO_x$ favors the $NO_x$ reduction reactions in the SCR. For ANR1=0.65, the SCR efficiency increases to 97% compared to the SCR efficiency of 71% in an aftertreatment system without downstream DOC at the same engine condition.

Figure 11A:
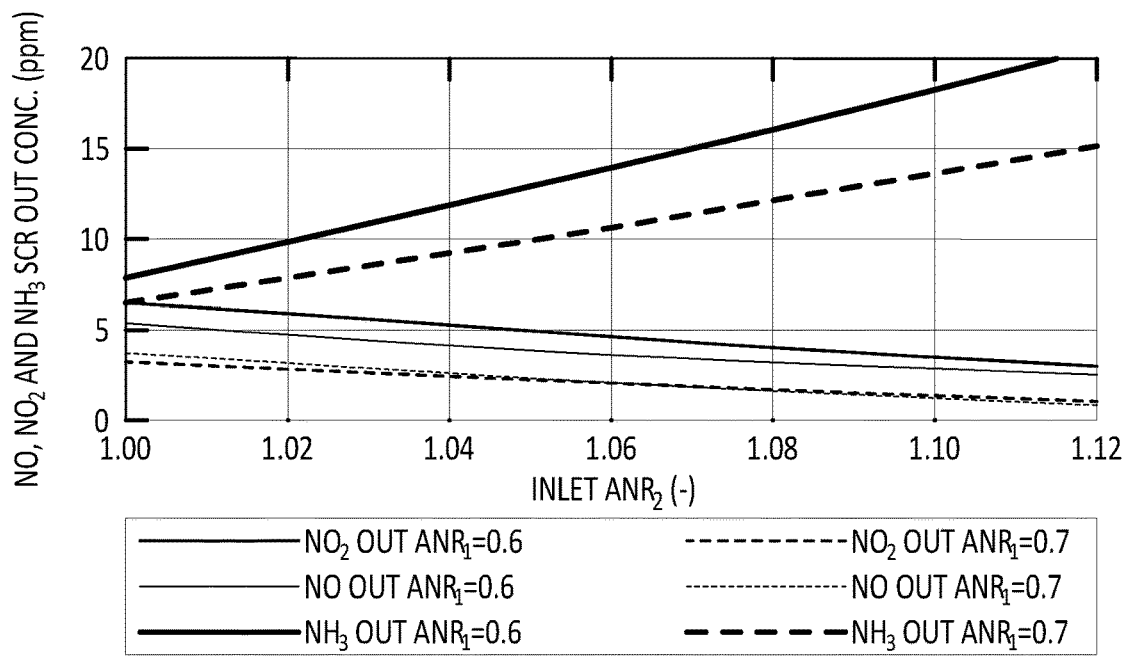
FIG. 11A shows the changes of the outlet $NO_2$, outlet NO and outlet $NH_3$ concentrations from the SCR with second ammonia to NOx ratio to the SCR. ANR2 for an aftertreatment system comprising a SCR-F, downstream DOC and SCR.
Figure 11B:
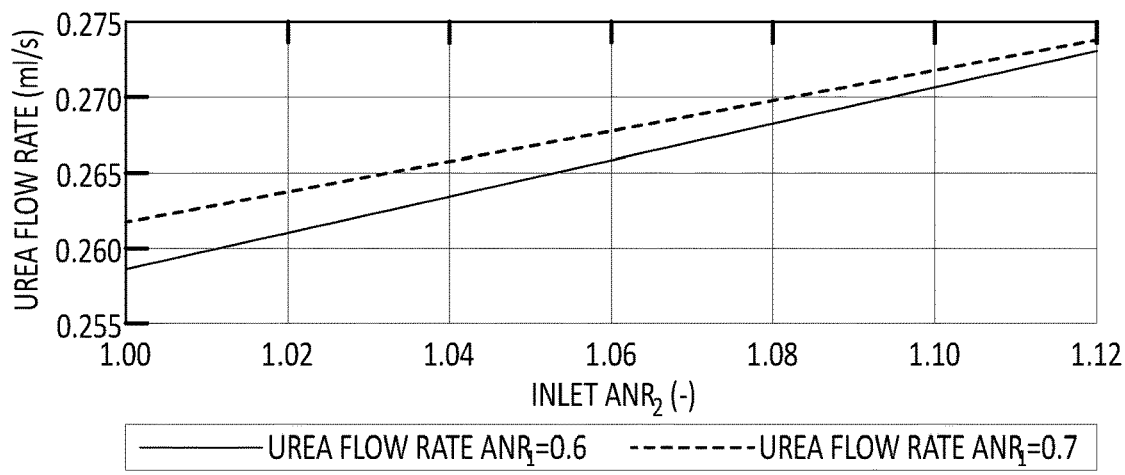
FIG. 11B shows the changes of the total reductant flowrate with the ANR2 for an aftertreatment system comprising SCR-F, downstream DOC and SCR.
Figure 11C:
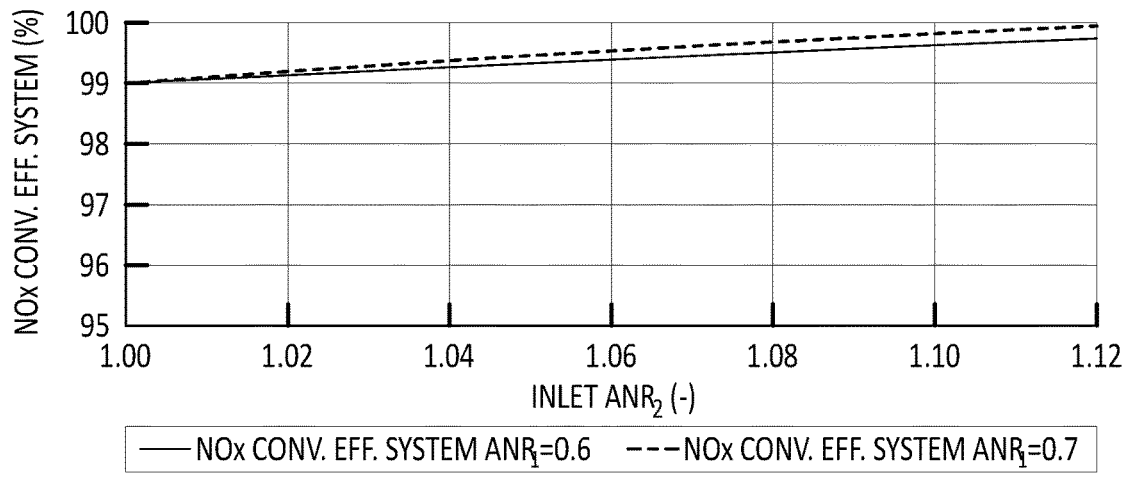
FIG. 11C shows the changes of the system $NO_x$ conversion efficiency with the ANR2 for an aftertreatment system comprising a SCR-F, downstream DOC and SCR.

FIG. 11A-11C illustrate modeling results for an aftertreatment system comprising SCR-F, downstream DOC and SCR where ANR1 is 0.6 and 0.7 at the given engine test conditions. FIG. 11A shows the changes of the outlet $NO_2$, outlet NO and out $NH_3$ concentrations from the SCR with the ANR2. FIG. 11B shows the changes of the total reductant flowrate with the ANR2. FIG. 10C shows the changes of the system $NO_x$ conversion efficiency with the ANR2. As can be seen from FIG. 11C, the system $NO_x$ conversion efficiency is at maximum of 99.9% for ANR=0.7 at ANR2=1.12. The near 100% efficiency is due to the favorable $NO_2/NO_x$ ratio into the SCR. At this engine condition, the downstream DOC converts 60% of the SCR-F outlet NO to $NO_2$. As can be seen from FIG. 11A, the outlet SCR $NO_2$ concentration for ANR1=0.7 is near zero and NO concentration is less than 6 ppm for ANR1=0.7. The maximum $NH_3$ slip is 20 ppm at ANR1=0.6. The low $NH_3$ slip is due to the higher utilization of the $NH_3$ for $NO_x$ reduction. FIG. 11B shows the total reductant flowrate increases as ANR2 increases.

FIG. 12 shows Table 3 which lists maximum $NO_x$ conversion efficiency of an aftertreatment system comprising a SCR-F, a downstream DOC and SCR with two reductant injectors at engine conditions 1, A, C, D and E listed in Table 2. As can be observed from Table 3, the system $NO_x$ conversion efficiency is over 99.2% for all the tested engine conditions. The value of ANR1 is in the range of 0.65 to 0.8 (0.72+/−0.08) depending on PM oxidation rate in the SCR-F, exhaust temperature, NO and $NO_2$ concentrations at the SCR-F inlet and exhaust gas flow rate conditions. The ANR2 has a narrow range of 1.03 to 1.07 (1.04+/−0.02) and the system is less sensitive to a change in the ANR2 value compared to ANR1.

FIG. 13 shows Table 4 which lists maximum PM oxidation rate of an aftertreatment system comprising a SCR-F, a downstream DOC and SCR with two reductant injectors at engine conditions 1, A, C, D and E listed in Table 2 and PM loading of 2 g/l. In the model results, the ANR1 is 0 and the ANR2 value is 1.12 for all cases in order to maximize the PM oxidation rate in the SCR-F. As can be seen in Table 4, the PM oxidation rates are 3-4 times higher than the values in Table 3. The ANR1=0 conditions can be used where a higher PM oxidation rate is desired while a decreased NOx reduction performance is acceptable.

D. Comparison of Modeling Results of Aftertreatment Systems of the Present Disclosure with Different Aftertreatment System FIG. 14 shows Table 5 comparing the performance of an aftertreatment system including only SCR-F (SCR-F only system) with an aftertreatment system including SCR-F, downstream DOC, and SCR system (SCR-F+downstream DOC+SCR system) for maximum NOx conversion efficiency. For SCR-F only system, ANR2 is zero and ANR equals ANR1 ranging from 1.05 to 1.08. As observed in Table 5, the SCR-F+downstream DOC+SCR system has 1.8-8.3% higher NOx conversion efficiency compared to the SCR-F only system. The PM oxidation rate is 140-300% higher in the SCR-F+downstream DOC+SCR system compared to the SCR-F only system. The $NH_3$ slip was observed to be 20-174 ppm in the SCR-F only system compared to 17-39 ppm in SCR-F+downstream DOC+SCR system. The total reductant flow rate was observed to be 1-3% higher in the SCR-F system.

Figure 15A:
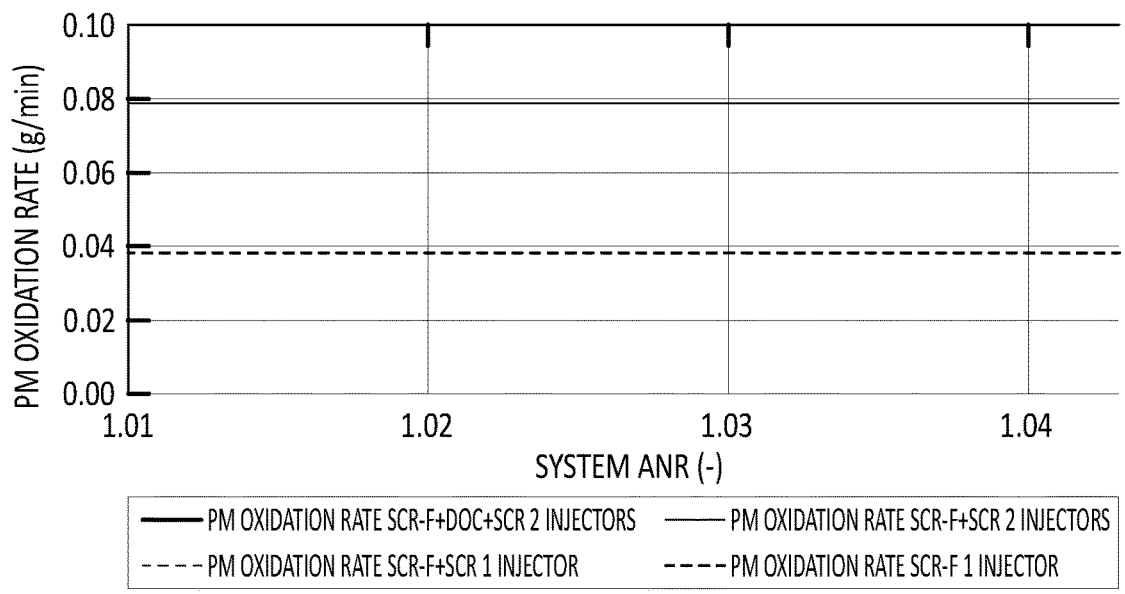
FIG. 15A is a graph comparing the PM oxidation rates of four engine aftertreatment systems.
Figure 15B:
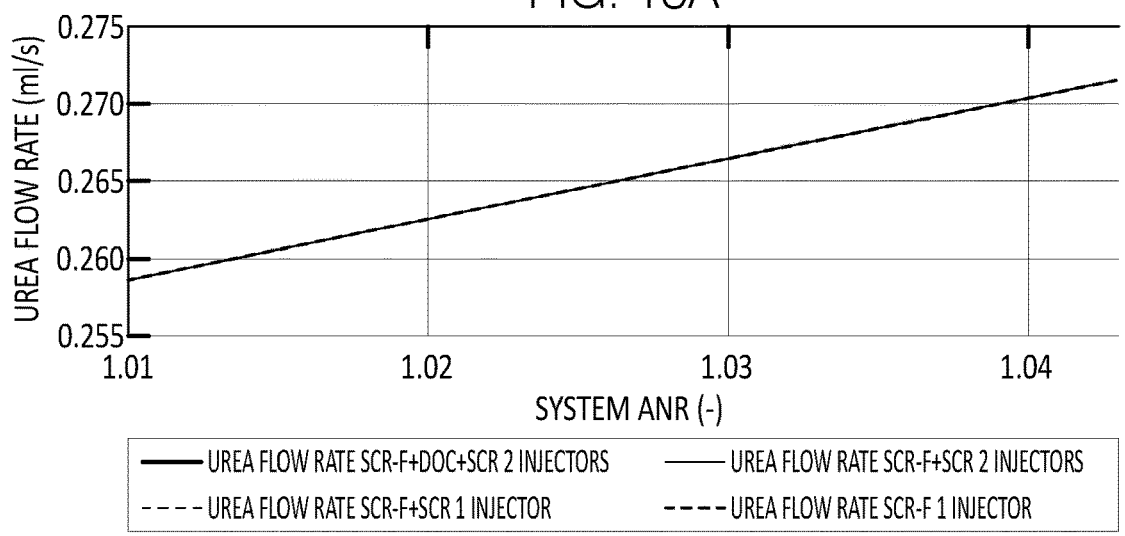
FIG. 15B is a graph comparing the urea flow rates of four engine aftertreatment systems.
Figure 15C:
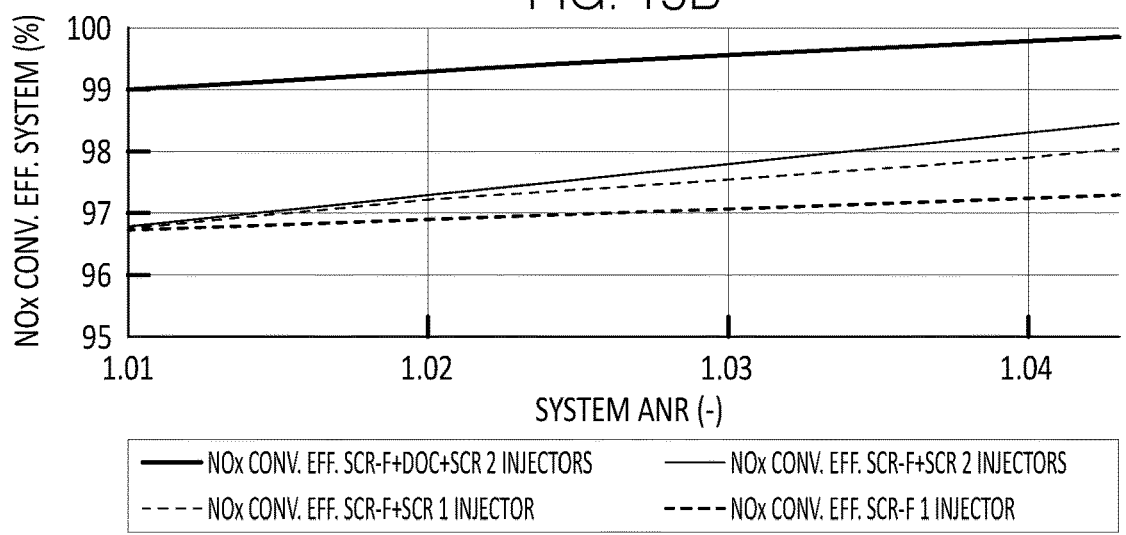
FIG. 15C is a graph comparing the $NO_x$ conversion efficiencies of four engine aftertreatment systems.

FIGS. 15A-15C compare the performance of four aftertreatment systems. The four aftertreatments system are: system 1 comprising a SCR-F+downstream DOC+SCR+ two reductant injectors; system 2 comprising a SCR-F+ SCR+two reductant injectors; system 3 comprising SCR-F+ SCR+one reductant injector; and system 4 comprising SCR-F+one reductant injector. The four systems were run with system ANR of 1.007 to 1.037. For systems 4, ANR2=0 and $ANR_{system}$=ANR1. The system ANR is defined as follows:

$$ANR_{system} = \frac{(ANR_1 NO_{x,in,SCR-F} + ANR_2 NO_{x,in,SCR})}{NO_{x,in,SCR-F}} \quad (33)$$

where ANR1 is the ANR at the first reductant injector and $NO_{x,Ln,SCR-F}$ is the inlet $NO_x$ concentration at SCR-F, ANR2 is the ANR at the second reductant injector and $NO_{x,in,SCR}$ is the inlet $NO_x$ concentration at SCR.

FIG. 15A shows the changes of the PM oxidation as a function of the system ANR in the four systems. The PM oxidation rate shows that the systems with two reductant injectors at ANR1=0.7 have oxidation rates of 0.079 g/min compared to 0.039 g/min for systems with 1 reductant injector. This 100% improvement in the PM oxidation rate is due to the lower forward diffusion rate at lower ANR1 values leading to higher available $NO_2$ in the PM cake and higher PM oxidation rate.

FIG. 15B shows the changes of the reductant flow rate as a function of the system ANR in the four systems. The reductant flowrate is the same for all the cases and is linearly proportional to the system ANR.

FIG. 15C shows the changes of the NOx conversion efficiency as a function of the system ANR in the four systems. As observed from FIG. 14A, at system ANR 1.027, the NOx conversion efficiency of the system 4 (SCR-F 1 injector) was observed to be 97.5; the system 3 (SCR-F+ SCR 1 injector) has a NOx conversion efficiency of 97.5%, the system 2 (SCR-F+SCR 2 injectors) has a NOx conversion efficiency of 97.8% and the system 1 (SCRF+downstream DOC+SCR 2 injectors) had the higher NOx conversion efficiency of 99.5%. The higher NOx conversion efficiency of system 1 is due to the favorable $NO_2$/NOx ratio in the SCR and the NOx conversion efficiency is consistently higher by 2% compared to the SCR-F system. FIGS. 14B and 14C show that, for a given amount of reductant flowrate, system 1 (SCR-F+downstream DOC+SCR 2 injectors) has higher NOx conversion efficiency (99.9% efficiency at ANR1=0.65 and ANR2=1.06) than the systems 2, 3, 4 which can be used to reduce the reductant or DEF consumption.

FIG. 16 shows a Table 6 which compares the performance of four aftertreatment systems. The four aftertreatments system are: system 1 comprising a SCR-F+downstream DOC+SCR+two reductant injectors; system 2 comprising a SCR-F+SCR+two reductant injectors; system 3 comprising SCR-F+SCR+one reductant injector; and system 4 comprising SCR-F+one reductant injector. For system 3 and system 4 which have one reductant injector, ANR1=1.04 and ANR2=0). For system 1 and system 2 which have two reductant injectors, ANR1=0.65 and ANR2=1.06. As shown in Table 7, there is 2.1% increase in the NOx conversion efficiency for the system 1 (SCR-F+downstream DOC compared to system 4 (SCR-F, one injector). The systems 1, 2 with two injectors have 80% higher PM oxidation rate. The $NH_3$ slip value for the system 1 with a downstream DOC is 14 ppm compared to 75 ppm for the system 4 (SCR-F only system) due to better utilization of $NH_3$ in the SCR. The reductant flow rate is 1.4% lower in the system 1 with downstream DOC than the system due to lower $NH_3$ slip and better $NH_3$ utilization.

E. Illustrative Combinations and Additional Examples

This section describes additional aspects and features of aftertreatment systems to treat exhaust gas of a diesel engine and methods to operate an aftertreatment system for a diesel engine, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An aftertreatment system to treat exhaust gas from a diesel engine comprising a selective catalytic reduction catalyst on a diesel particulate filter (SCR-F); a first reductant injector connected to an exhaust gas passage upstream of the SCR-F; a downstream diesel oxidation catalyst (DOC) disposed downstream of the SCR-F; a selective catalyst reduction catalyst (SCR) disposed downstream of the downstream DOC; a second reductant injector coupled to an exhaust gas passage positioned between the downstream DOC and the SCR; and a controller to determine a desired particulate matter (PM) oxidation in the SCR-F and a desired system NOx conversion based on engine conditions, and to control a first reductant flowrate from the first reductant injector and a second reductant flowrate from the second reductant injector based on the desired PM oxidation in the SCR-F and the desired system NOx conversion.

A1. The aftertreatment system of paragraph A0, wherein a reductant from the first and second reductant injectors is a DEF solution, and wherein the controller is further configured to determine a first ammonia to NOx ratio (ANR1) and a second ammonia to NOx ratio (ANR2) based on the desired PM oxidation and the desired system NOx conversion, to determine the first reductant flowrate based on the ANR1 and a NOx inlet concentration to the SCR-F, and to determine the second reductant flowrate based on the ANR2 and a NOx inlet concentration to the SCR.

A2. The aftertreatment system of paragraph A0 or paragraph A1, further comprising a first urea decomposition tube positioned in an exhaust gas passage to receive the reductant from the first reductant injector, a first mixer downstream of the first urea decomposition tube, a second urea decomposition tube positioned in the exhaust gas passage between the downstream DOC and the SCR to receive the reductant from the second reductant injector and a second mixer downstream of the second urea decomposition tube.

A3. The aftertreatment system of claim A0 or A1, further comprising a first temperature sensor disposed at the exhaust gas passage upstream of the SCR-F, a second temperature sensor disposed at an exhaust gas passage downstream of the SCR-F, a third temperature sensor disposed at the exhaust gas passage upstream of the SCR, a fourth temperature sensor disposed at an exhaust gas passage downstream of the SCR, and a pressure sensor to detect a pressure difference across the SCR-F.

A4. The aftertreatment system of paragraph A3, further comprising a first NOx sensor disposed at an exhaust gas passage connected to the diesel engine and configured to detect a NOx concentration from the exhaust gas directly discharged from the diesel engine, and a second NOx sensor disposed at the exhaust gas passage upstream of the SCR and configured to detect the inlet NOx concentration to the SCR.

A5. The aftertreatment system of paragraph A0, further comprising a DOC disposed upstream of the SCR-F and configured to receive the exhaust gas from the diesel engine upstream of the first reductant injector, and a fifth temperature sensor disposed in the exhaust gas passage connected to the diesel engine.

A6. The aftertreatment system of paragraph A0, further comprising a diesel cold start concept catalyst (dCSC) disposed upstream of the SCR-F and configured to receive the exhaust gas from the diesel engine upstream of the first reductant injector, and a fifth temperature sensor disposed in the exhaust gas passage connected to the diesel engine.

A7. The aftertreatment system of paragraph A0, further comprising a diesel cold start concept catalyst (dCSC) disposed upstream of the SCR-F and configured to receive the exhaust gas from the diesel engine upstream of the first reductant injector, an electrically heated catalyst (EHC) disposed between the first reductant injector and the SCR-F, and a fifth temperature sensor disposed in the exhaust gas passage connected to the diesel engine.

B0. An aftertreatment system to treat exhaust gas from a diesel engine, comprising a selective catalytic reduction catalyst on a diesel particulate filter (SCR-F); a first reductant injector connected to an exhaust gas passage upstream of the SCR-F; a downstream diesel oxidation catalyst (DOC) disposed downstream of the SCR-F; a selective catalyst reduction catalyst (SCR) disposed downstream of the downstream DOC; a second reductant injector coupled to an exhaust gas passage and positioned between the downstream DOC and the SCR; and a controller to calculate a desired particulate matter (PM) oxidation in the SCR-F and a desired system NOx conversion efficiency based on engine speed and load conditions, to determine a first ammonia to NOx ratio to the SCR-F and a second ammonia to NOx ratio to the SCR based on (i) the desired PM oxidation, (ii) the desired NOx conversion efficiency, and (iii) states of the SCR-F, the downstream DOC and the SCR, and to determine a first reductant flowrate from the first reductant injector and a second reductant flowrate from the second reductant injector corresponding to the first ammonia to NOx ratio and the second ammonia to NOx ratio, respectively. A reductant is DEF solution, and wherein the states of the SCR-F, the downstream DOC and the SCR include temperatures, PM mass and NOx concentrations of the exhaust gas as the exhaust gas flows through the SCR-F, the downstream DOC and the SCR, respectively.

B1. The aftertreatment system of paragraph B0, wherein the states are determined by state estimators based on energy and mass conservation equations.

B2. The aftertreatment system of paragraph B1, further comprising a first temperature sensor disposed at the exhaust gas passage upstream of the SCR-F, a second temperature sensor disposed at an exhaust gas passage downstream of the SCR-F, a third temperature sensor disposed at the exhaust gas passage upstream of the SCR, a fourth temperature sensor disposed at an exhaust gas passage downstream of the SCR, and a pressure sensor to detect a pressure difference across the SCR-F.

B3. The aftertreatment system of paragraph B2, further comprising a first NOx sensor disposed at an exhaust gas passage connected to the diesel engine and configured to detect a NOx concentration from the diesel engine, and a second NOx sensor disposed at the exhaust gas passage upstream of the SCR and configured to detect an inlet NOx concentration to the SCR.

C0. A method to operate an aftertreatment system for a diesel engine, the aftertreatment system including a SCR-F, a SCR downstream of the SCR-F and a downstream DOC disposed between the SCR-F and the SCR. The method comprising determining a desired PM oxidation rate in the SCR-F and a system NOx conversion efficiency based on engine speed and load conditions; and determining a first reductant flowrate from a first reductant injector positioned upstream of the SCR-F and a second reductant flowrate from a second reductant injector positioned upstream of the SCR based on the desired PM oxidation rate, the desired system NOx conversion efficiency, and changes of PM concentration, NOx concentration and temperature as exhaust gas flows through the SCR-F, the downstream DOC and the SCR.

C1. The method of paragraph C0, wherein the changes of the PM concentration, the NOx concentration and the temperature are estimated by differential equations based on energy and mass conservation of species in the SCR-F, the downstream DOC and the SCR.

C2. The method of paragraph C1, wherein first exhaust gas temperature in an exhaust gas passage upstream of the SCR-F, a second exhaust gas temperature in an exhaust gas passage downstream of the SCR-F, a third temperature in an exhaust gas passage upstream of the SCR, a fourth exhaust gas temperature in an exhaust gas passage downstream of the SCR, a first inlet NOx concentration to the SCR-F, and a second inlet NOx concentration to the SCR are used to estimate the changes of the PM mass, the NOx concentration and the temperature.

C3. The method of paragraph C2, wherein the first exhaust gas temperature is determined by a first temperature sensor positioned in the exhaust gas passage upstream of the SCR-F, the second exhaust gas temperature is determined by a second temperature sensor positioned at the exhaust gas passage downstream of the SCR-F, the third exhaust gas temperature is determined by a third temperature sensor positioned in the exhaust gas passage upstream of the SCR, the fourth exhaust gas temperature is determined by a fourth temperature sensor positioned in the exhaust gas passage downstream of the SCR, the first inlet NOx concentration to the SCR-F is determined by a first NOx sensor positioned in an exhaust gas passage upstream of the SCR-F, and the second inlet NOx concentration to the SCR is determined by a NOx sensor positioned in an exhaust gas passage upstream of the SCR.

C4. The method of paragraph C0, C1, C2 or C3, further comprising determining the first reductant flowrate based on a first ammonia to NOx ratio to the SCR-F and a first inlet NOx concentration; and determining the second reductant flowrate based on a second ammonia to NOx ratio to the SCR and a second inlet NOx concentration.

C5. The method of paragraph C4, further comprising decreasing the first ammonia to $NO_x$ ratio to increase the desired PM oxidation rate in the SCR-F.

C6. The method of paragraph C4, further comprising maintaining a total reductant flowrate while adjusting the first reductant flowrate and the second reductant flowrate to achieve the desired system $NO_x$ conversion efficiency and the desired PM oxidation rate based on the first ammonia to $NO_x$ ratio and the second ammonia to $NO_x$ ratio.

C7. The method of paragraph C4, further comprising maintaining the first ammonia to $NO_x$ ratio not greater than a predetermined value at preset engine conditions.

C8. The method of paragraph C4, further comprising setting the first ammonia to $NO_x$ ratio to zero to maximize the PM oxidation rate at preset engine conditions.

C9. The method of paragraph C0, wherein the aftertreatment system further includes another DOC disposed upstream of the SCR-F.

C10. The method of paragraph C0, wherein the aftertreatment system further includes a dCSC™ disposed upstream of the SCR-F.

Advantages, Features, and Benefits

The different embodiments and examples of the aftertreatment system for a diesel engine and the method to control or operate the aftertreatment system described herein provide several advantages over known solutions for improve PM oxidation rate and the system $NO_x$ conversion efficiency. For example, illustrative embodiments and examples described herein includes a DOC which is directly upstream of a SCR. The inclusion of this DOC increases local $NO_2/NO_x$ ratio to optimum values (e.g., $NO_2/NO_x$ ratio of 0.5) at the downstream SCR, which lead to higher fast SCR reactions and thus greater than 99.5% system $NO_x$ conversion efficiency. The downstream SCR performance in this system is increased by 30-60% depending on engine operation conditions.

Additionally, and among other benefits, illustrative embodiments and examples described herein allow better control of inlet ANR1 for the SCR-F and ANR2 for the SCR, which lead to accurate control of $NH_3$ coverage fraction in both the SCR-F and the SCR.

Additionally, and among other benefits, illustrative embodiments and examples described herein can increase PM passive oxidation rate in the SCR-F using low SCR-F inlet ANR1 (e.g., less than 0.65). Up to 90% higher PM oxidation rate can be achieved leading to a smaller number of active regeneration events, which saves fuel and reduces pressure drop across the SCR-F.

Additionally, and among other benefits, illustrative embodiments and examples described herein allow a more robust control system results that can adapt to reduction in SCR-F, $NO_x$ conversion performance due to catalyst aging, deactivation, as loading and the possible issue with PGM metal transport from the DOC and deposition on the SCR-F.

Additionally, and among other benefits, illustrative embodiments and examples described herein provide a more robust control system results that can help achieving better real-world emission compliance using two injectors.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An aftertreatment system to treat exhaust gas from a diesel engine, comprising:
a selective catalytic reduction catalyst on a diesel particulate filter (SCR-F);
a first reductant injector connected to an exhaust gas passage upstream of the SCR-F;
a downstream diesel oxidation catalyst (DOC) disposed downstream of the SCR-F;
a selective catalytic reduction catalyst (SCR) disposed downstream of the downstream DOC;
a second reductant injector coupled to an exhaust gas passage positioned between the downstream DOC and the SCR; and
a controller to determine a desired particulate matter (PM) oxidation rate in the SCR-F and a desired system NOx conversion based on engine conditions, and to control a first reductant flowrate from the first reductant injector and a second reductant flowrate from the second reductant injector based on the desired PM oxidation rate in the SCR-F and the desired system NOx conversion;

wherein a reductant from the first and second reductant injectors is a urea solution, and wherein the controller is further configured to determine a first ammonia to NOx ratio (ANR1) and a second ammonia to NOx ratio (ANR2) based on the desired PM oxidation rate and the desired system NOx conversion, to determine the first reductant flowrate based on the ANR1 and a NOx inlet concentration, an inlet temperature and an exhaust flowrate to the SCR-F, and to determine the second reductant flowrate based on the ANR2 and a NOx inlet concentration, an inlet temperature and an exhaust flowrate to the SCR.

2. The aftertreatment system of claim 1, further comprising a first urea decomposition tube positioned in an exhaust gas passage to receive the reductant from the first reductant injector, a first mixer downstream of the first urea decomposition tube, a second urea decomposition tube positioned in the exhaust gas passage between the downstream DOC and the SCR to receive the reductant from the second reductant injector and a second mixer downstream of the second urea decomposition tube.

3. The aftertreatment system of claim 1, further comprising a first temperature sensor disposed at the exhaust gas passage upstream of the SCR-F, a second temperature sensor disposed at an exhaust gas passage downstream of the SCR-F between the SCR-F and the downstream DOC, a third temperature sensor disposed at the exhaust gas passage upstream of the SCR, a fourth temperature sensor disposed at an exhaust gas passage downstream of the SCR, and a pressure sensor to detect a pressure difference across the SCR-F.

4. The aftertreatment system of claim 3, further comprising a first NOx sensor disposed at an exhaust gas passage connected to the diesel engine and configured to detect a NOx concentration from the exhaust gas directly discharged from the diesel engine, and a second NOx sensor disposed at the exhaust gas passage upstream of the SCR and configured to detect the inlet NOx concentration to the SCR.

5. The aftertreatment system of claim 4, further comprising a DOC disposed upstream of the SCR-F and configured to receive the exhaust gas from the diesel engine upstream of the first reductant injector, and a fifth temperature sensor disposed in the exhaust gas passage connected to the diesel engine.

6. The aftertreatment system of claim 4, further comprising a diesel cold start concept catalyst disposed upstream of the SCR-F and configured to receive the exhaust gas from the diesel engine upstream of the first reductant injector, and a fifth temperature sensor disposed in the exhaust gas passage connected to the diesel engine, wherein the diesel cold start concept catalyst is configured to adsorb and store $NO_x$ and hydrocarbons during a cold start period and acts as a diesel oxidation catalyst device at a normal operation condition.

7. The aftertreatment system of claim 4, further comprising a diesel cold start concept catalyst disposed upstream of the SCR-F and configured to receive the exhaust gas from the diesel engine upstream of the first reductant injector, an electrically heated catalyst (EHC) disposed between the first reductant injector and the SCR-F, and a fifth temperature sensor disposed in the exhaust gas passage connected to the diesel engine, wherein the diesel cold start concept catalyst is configured to adsorb and store $NO_x$ and hydrocarbons during a cold start period and acts as a diesel oxidation catalyst device at a normal operation condition.

8. An aftertreatment system to treat exhaust gas from a diesel engine, comprising:
a selective catalytic reduction catalyst on a diesel particulate filter (SCR-F);
a first reductant injector connected to an exhaust gas passage upstream of the SCR-F;
a downstream diesel oxidation catalyst (DOC) disposed downstream of the SCR-F;
a selective catalyst reduction catalyst (SCR) disposed downstream of the downstream DOC;
a second reductant injector coupled to an exhaust gas passage and positioned between the downstream DOC and the SCR; and
a controller to calculate a desired particulate matter (PM) oxidation rate in the SCR-F and a desired system NOx conversion efficiency based on engine speed and load conditions, to determine a first ammonia to NOx ratio to the SCR-F and a second ammonia to NOx ratio to the SCR based on (i) the desired PM oxidation rate, (ii) the desired system NOx conversion efficiency, and (iii) states of the SCR-F, the downstream DOC and the SCR, and to determine a first reductant flowrate from the first reductant injector and a second reductant flowrate from the second reductant injector corresponding to the first ammonia to NOx ratio and the second ammonia to NOx ratio, respectively;
wherein a reductant is a diesel exhaust fluid (DEF) solution, and wherein the states of the SCR-F, the downstream DOC and the SCR include temperatures, PM concentrations and NOx concentrations of the exhaust gas as the exhaust gas flows through the SCR-F, the downstream DOC and the SCR, respectively.

9. The aftertreatment system of claim 8, wherein the states are determined by state estimators based on energy and mass conservation equations.

10. The aftertreatment system of claim 9, further comprising a first temperature sensor disposed at the exhaust gas passage upstream of the SCR-F, a second temperature sensor disposed at an exhaust gas passage downstream of the SCR-F, a third temperature sensor disposed at the exhaust gas passage upstream of the SCR, a fourth temperature sensor disposed at an exhaust gas passage downstream of the SCR, and a pressure sensor to detect a pressure difference across the SCR-F.

11. The aftertreatment system of claim 10, further comprising a first NOx sensor disposed at an exhaust gas passage connected to the diesel engine and configured to detect a NOx concentration from the diesel engine, and a second NOx sensor disposed at the exhaust gas passage upstream of the SCR and configured to detect an inlet NOx concentration to the SCR.

12. A method to operate an aftertreatment system for a diesel engine, the aftertreatment system including a SCR-F, a SCR downstream of the SCR-F and a downstream DOC disposed between the SCR-F and the SCR, the method comprising:
determining a desired PM oxidation rate in the SCR-F and a desired system NOx conversion efficiency based on engine speed and load conditions;
determining a first reductant flowrate from a first reductant injector positioned upstream of the SCR-F and a second reductant flowrate from a second reductant injector positioned upstream of the SCR based on the desired PM oxidation rate, the desired system NOx conversion efficiency, and changes of PM mass retained, NOx concentrations and temperatures as exhaust gas flows through the SCR-F, the downstream DOC and the SCR; and determining the first reductant flowrate based on a first ammonia to NOx ratio and a first inlet NOx concentration to the SCR-F, a first inlet exhaust gas temperature in an exhaust gas passage upstream of the SCR-F, and an exhaust flow rate to the SCR-F; and determining the second reductant flowrate based on a second ammonia to NOx ratio and a second inlet NOx concentration to the SCR, a second inlet exhaust gas temperature in an exhaust gas passage upstream of the SCR and an exhaust flow rate to the SCR.

13. The method of claim 12, wherein the changes of the mass retained, the NOx concentrations and the temperatures are estimated by differential equations based on energy and mass conservation of species in the SCR-F, the downstream DOC and the SCR.

14. The method of claim 12, wherein the temperatures include the first inlet exhaust gas temperature in the exhaust gas passage upstream of the SCR-F, a second exhaust gas temperature in an exhaust gas passage downstream of the SCR-F between the SCR-F and the downstream DOC, the second inlet exhaust gas temperature in the exhaust gas passage upstream of the SCR, and a fourth exhaust gas temperature in an exhaust gas passage downstream of the SCR.

15. The method of claim 14, wherein the first inlet exhaust gas temperature is determined by a first temperature sensor positioned in the exhaust gas passage upstream of the SCR-F, the second exhaust gas temperature is determined by a second temperature sensor positioned at the exhaust gas passage downstream of the SCR-F, the second inlet exhaust gas temperature is determined by a third temperature sensor positioned in the exhaust gas passage upstream of the SCR, the fourth exhaust gas temperature is determined by a fourth temperature sensor positioned in the exhaust gas passage downstream of the SCR, the first inlet NOx concentration to the SCR-F is determined by a first NOx sensor positioned in an exhaust gas passage upstream of the SCR-F, and the second inlet NOx concentration to the SCR is determined by a NOx sensor positioned in an exhaust gas passage upstream of the SCR.

16. The method of claim 12, further comprising decreasing the first ammonia to $NO_x$ ratio to increase the desired PM oxidation rate in the SCR-F.

17. The method of claim 12, wherein the aftertreatment system further includes another DOC disposed upstream of the SCR-F.

18. The method of claim 12, wherein the aftertreatment system further includes a diesel cold start concept catalyst disposed upstream of the SCR-F, wherein the diesel cold start concept catalyst is configured to adsorb and store $NO_x$ and hydrocarbons during a cold start period and acts as a diesel oxidation catalyst device at a normal operation condition.

* * * * *